(12) United States Patent
Hayashi et al.

(10) Patent No.: US 12,234,363 B2
(45) Date of Patent: Feb. 25, 2025

(54) AQUEOUS INK, INK CARTRIDGE AND INK JET RECORDING METHOD

(71) Applicant: CANON KABUSHIKI KAISHA, Tokyo (JP)

(72) Inventors: Katsuhiro Hayashi, Kanagawa (JP); Tsuyoshi Furuse, Kanagawa (JP); Masahito Miyabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 17/203,891

(22) Filed: Mar. 17, 2021

(65) Prior Publication Data

US 2021/0292577 A1  Sep. 23, 2021

(30) Foreign Application Priority Data

Mar. 19, 2020 (JP) .................. 2020-049697
Mar. 19, 2020 (JP) .................. 2020-049698
(Continued)

(51) Int. Cl.
*C09D 11/033* (2014.01)
*B41J 2/175* (2006.01)
(Continued)

(52) U.S. Cl.
CPC .......... *C09D 11/033* (2013.01); *B41J 2/17503* (2013.01); *C09D 11/037* (2013.01); *C09D 11/104* (2013.01)

(58) Field of Classification Search
CPC ... C09D 11/033; C09D 11/037; C09D 11/104; C09D 11/322; B41J 2/17503
See application file for complete search history.

(56) References Cited

U.S. PATENT DOCUMENTS

| 7,977,409 B2 | 7/2011 | Nishiguchi et al. |
| 8,425,027 B2 | 4/2013 | Nishiwaki et al. |

(Continued)

FOREIGN PATENT DOCUMENTS

| JP | H8269310 A | 10/1996 |
| JP | 08295792 A * | 11/1996 |

(Continued)

OTHER PUBLICATIONS

English Machine Translation of JP2001139864A ("Machine_Translation_Tokita_JP_2001139864_A") (Year: 2001).*

(Continued)

*Primary Examiner* — Jennifer A Smith
*Assistant Examiner* — Jeffrey Eugene Barzach
(74) *Attorney, Agent, or Firm* — Venable LLP

(57) ABSTRACT

Provided are an aqueous ink for ink jet capable of recording an image having excellent abrasion resistance and glossiness and an ink cartridge and an ink jet recording method using the aqueous ink. Provided is an aqueous ink for ink jet including a coloring material and a plurality of resins (first resin and second resin) different from the coloring material. The first resin is a resin particle formed of a first polyester resin and the second resin is at least one of (i) a block copolymer containing an A block having no acid group and a B block having an acid group and (ii) a second polyester resin having a sulfonic acid group. Further, an ink cartridge using the aqueous ink and an ink jet recording method in which the aqueous ink is ejected from an ink jet recording head to record an image on a recording medium are provided.

17 Claims, 2 Drawing Sheets

(30) Foreign Application Priority Data

Mar. 19, 2020 (JP) .................................. 2020-049699
Feb. 17, 2021 (JP) .................................. 2021-023121

(51) Int. Cl.
*C09D 11/037* (2014.01)
*C09D 11/104* (2014.01)

(56) References Cited

U.S. PATENT DOCUMENTS

| | | | |
|---|---|---|---|
| 8,889,763 | B2 | 11/2014 | Hayashi et al. |
| 9,260,611 | B2 | 2/2016 | Hayashi et al. |
| 9,365,733 | B2 | 6/2016 | Hayashi et al. |
| 10,125,284 | B2 | 11/2018 | Gouda et al. |
| 10,131,806 | B2 * | 11/2018 | Hayashi ............... C09D 11/38 |
| 10,774,229 | B2 | 9/2020 | Maeda |
| 10,995,230 | B2 | 5/2021 | Yamazaki et al. |
| 2005/0052515 | A1* | 3/2005 | Udagawa ............ C09D 11/32 347/100 |
| 2010/0021635 | A1* | 1/2010 | Ookawa ............ C08F 293/005 427/256 |
| 2010/0086686 | A1 | 4/2010 | Nishiguchi et al. |
| 2013/0196064 | A1* | 8/2013 | Shimanaka .......... C09D 17/001 525/299 |
| 2015/0024134 | A1 | 1/2015 | Hayashi et al. |
| 2015/0218396 | A1* | 8/2015 | Brust ................. C09D 11/30 524/590 |
| 2015/0376427 | A1* | 12/2015 | Mizutani ............. C09C 1/3692 106/31.75 |
| 2016/0215157 | A1 | 7/2016 | Kakikawa et al. |
| 2016/0340530 | A1 | 11/2016 | Horiuchi et al. |
| 2017/0253754 | A1* | 9/2017 | Kawaharada ......... C09D 11/14 |
| 2018/0282564 | A1 | 10/2018 | Matsuzaki et al. |
| 2019/0292391 | A1* | 9/2019 | Seguchi ............... B41M 7/009 |
| 2020/0071554 | A1 | 3/2020 | Furuse et al. |
| 2020/0079916 | A1* | 3/2020 | Mutsuda ............... B29B 9/06 |
| 2020/0199387 | A1* | 6/2020 | Utsugi ................. C08L 25/08 |
| 2021/0002501 | A1* | 1/2021 | Toeda ................. C09D 11/102 |
| 2021/0139726 | A1* | 5/2021 | Ojima ............... C08G 63/6886 |

FOREIGN PATENT DOCUMENTS

| | | | |
|---|---|---|---|
| JP | 2001139864 A | * | 5/2001 |
| JP | 2014088552 A | | 5/2014 |
| JP | 2015021023 A | * | 2/2015 |
| JP | 2016108455 A | * | 6/2016 |
| JP | 2016124975 A | * | 7/2016 |
| JP | 20177210602 A | | 11/2017 |
| JP | 2017226834 A | | 12/2017 |
| JP | 2018127521 A | * | 8/2018 |
| JP | 2018150413 A | | 9/2018 |
| JP | 2018150518 A | | 9/2018 |
| JP | 2018177990 A | * | 11/2018 |
| JP | 2018204012 A | | 12/2018 |
| JP | 2019001927 A | * | 1/2019 |
| JP | 2019199566 A | | 11/2019 |
| WO | WO-2020129738 A1 | * | 6/2020 |

OTHER PUBLICATIONS

English Machine Translation of JP2018127521A ("Machine_Translation_Tanaka_JP_2018127521_A") (Year: 2018).*
English Machine Translation of WO2020129738A1 ("Machine_Translation_Kunii_WO_2020129738_A1") (Year: 2020).*
English machine translation of JP-2001139864-A (Year: 2001).*
English machine translation of JP-2018127521-A (Year: 2018).*
English machine translation of JP-08295792-A (Year: 1996).*
English machine translation of JP-2016124975-A (Year: 2016).*
English machine translation of JP-2015021023-A (Year: 2015).*
English machine translation of JP-2018177990-A (Year: 2018).*
English machine translation of JP-2016108455-A (Year: 2016).*
English machine translation of JP-2019001927-A (Year: 2019).*
European Search Report issued in corresponding European Application No. 21163422.5 dated Sep. 6, 2021.
Japanese Office Action issued in corresponding Japanese Application No. 2021-023121 dated Jan. 7, 2025.

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, an ink jet recording apparatus enables easy and inexpensive recording of images having high definition and high glossiness that are almost equivalent to those achieved by silver halide photography and offset printing.

As one of the inks capable of recording an image having excellent glossiness, there is a dye ink containing a dye as a coloring material. By using the dye ink, it is possible to record a high quality image with reduced graininess. However, the image recorded with the dye ink has a problem that the fastness is deteriorated due to the decomposition of the dye. For this reason, in recent years, pigment inks containing pigments have come to be used as coloring materials. As a pigment ink capable of improving the fixability of a pigment on a recording medium, for example, an aqueous ink for ink jet containing a polyester-based resin particle has been proposed (Japanese Patent Application Laid-Open No. 2014-88552). In addition, an aqueous dispersion containing a polyester-based colored resin fine particle and an ink using the same have been proposed (Japanese Patent Application Laid-Open No. H08-269310).

SUMMARY OF THE INVENTION

The present inventors have studied the aqueous inks proposed in Japanese Patent Application Laid-Open No. 2014-88552 and Japanese Patent Application Laid-Open No. H08-269310. As a result, it has been found that it is difficult to record an image in which both abrasion resistance and glossiness are compatible at the level required in recent years.

Therefore, an object of the present invention is to provide an aqueous ink for ink jet capable of recording an image having excellent abrasion resistance and glossiness. Another object of the present invention is to provide an ink cartridge and an ink jet recording method using the aqueous ink.

That is, according to an aspect of the present invention, there is provided an aqueous ink for ink jet comprising: a coloring material; and a plurality of resins different from the coloring material, in which the plurality of resins includes a first resin and a second resin, the first resin is a resin particle formed of a first polyester resin and the second resin is at least one of (i) a block copolymer containing an A block having no acid group and a B block having an acid group and (ii) a second polyester resin having a sulfonic acid group.

According to the present invention, it is possible to provide an aqueous ink for ink jet capable of recording an image having excellent abrasion resistance and glossiness. In addition, according to another aspect of the present invention, it is possible to provide an ink cartridge and an ink jet recording method using the aqueous ink.

Further features of the present invention will become apparent from the following description of exemplary embodiments with reference to the attached drawings.

DESCRIPTION OF THE EMBODIMENTS

Figure 1:
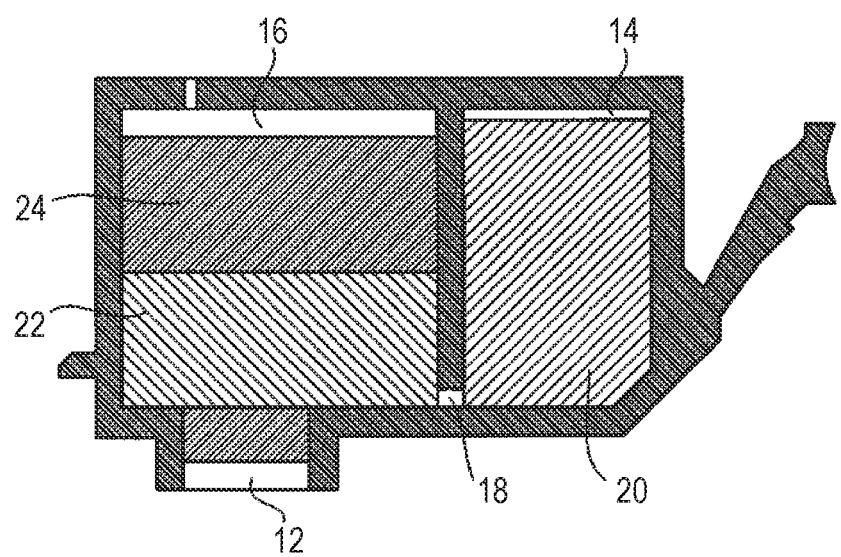
FIG. 1 is a cross-sectional view schematically illustrating an exemplary embodiment of an ink cartridge according to the present invention.

The present invention will be described in more detail below with reference to preferred exemplary embodiments. In the present invention, in a case where the compound is a salt, the salt is present in a state in which the salt is dissociated into ions in an ink, which is, however, expressed as "salt is contained" for convenience according to the present invention. Further, an aqueous ink for ink jet may be simply referred to as "ink" in some cases. Unless otherwise specified, the physical property values are values at normal temperature (25° C.), normal pressure (1 atm=101,325 Pa) and normal humidity (relative humidity: 50%). The term "unit" means a unit structure corresponding to one monomer, unless otherwise specified. When being written as "(meth)acrylic acid" and "(meth)acrylate", the terms mean "acrylic acid or methacrylic acid" and "acrylate or methacrylate", respectively.

A polyester resin usually includes a unit derived from a polyhydric alcohol and a unit derived from a polycarboxylic acid. A structure containing an ester bond (—COO—), which includes a unit derived from a polyhydric alcohol and a unit derived from a polycarboxylic acid, is also referred to as an "ester unit".

The oxygen atom constituting the carbonyl group of the ester bond is polarized to $\delta^-$. In addition, since a general recording medium used in the ink jet recording method is neutral to acidic, a hydrogen atom polarized to $\delta^+$ is present. When an ink containing a resin particle formed of a polyester resin is applied to a recording medium, an oxygen atom polarized to $\delta^-$ in the polyester resin and a hydrogen atom polarized to $\delta^+$ in the recording medium are attracted and thus the recording medium and the resin particle are easily brought into close contact with each other. Further, the molecular chain of the polyester resin having a carboxylic acid group is in a state of being entangled by hydrogen bonds generated between a plurality of carboxylic acid groups in the recording medium. Then, the abrasion resistance of an image is exhibited by the adhesion between the recording medium and the resin particle and the entanglement of the molecular chains of the polyester resin.

The present inventors have studied that by suppressing the aggregation of a resin particle formed of a first polyester resin as a first resin (hereinafter, also simply referred to as "resin particle"), the hydrophilicity of the resin particle is enhanced in order to improve the smoothness of a recorded image. Specifically, it has been expected that the rapid aggregation of the resin particle can be suppressed by controlling the hydrophilicity of the surface of the resin particle. However, it has been found that even in a case where the hydrophilicity of the resin particle is enhanced, the glossiness of the recorded image may not be improved in some cases. Therefore, as a result of further studies, it has been found that by incorporating a second resin, which will be described later, into the ink together with the resin particle, it is possible to record an image having improved glossiness without impairing the abrasion resistance. This second resin is at least one of (i) a block copolymer containing an A block having no acid group and a B block having an acid group and (ii) a second polyester resin having a sulfonic acid group.

As a method of enhancing the hydrophilicity of the polyester resin forming the resin particle, there is a method of incorporating an acid group into the molecular chain of the polyester. However, according to this method, the water solubility of the polyester resin is enhanced and the shape of the resin particle is not easily maintained. Therefore, the polyester resin is gradually dissolved in the aqueous ink and the viscosity of the ink is increased. As a result, the leveling properties between dots of the ink applied to the recording medium are lowered and macro unevenness is generated on the image surface, so that the glossiness of the image is not improved.

In contrast, the ink according to the embodiment of the present invention contains the second resin together with the resin particle formed of the first polyester resin as the first resin. The second resin is at least one of (i) a block copolymer containing an A block having no acid group and a B block having an acid group and (ii) a second polyester resin having a sulfonic acid group. In a case where a block copolymer is used as the second resin, the resin particle and the A block can be physically adsorbed by hydrophobic interaction. Further, the acid group in the B block of the block copolymer can impart hydrophilicity to the resin particle while maintaining the shape of the particle. In a case where the second polyester resin is used as the second resin, the first polyester resin and the second polyester resin are physically adsorbed by hydrophobic interaction. In addition to this, the sulfonic acid group of the second polyester resin makes the resin particle hydrophilic while maintaining the shape as a particle. As a result, the rapid aggregation of the resin particle can be suppressed and even micro unevenness on the image surface is reduced, so that the glossiness of the image can be improved. In order to efficiently exert this effect, the first resin and the second resin need to be different from the coloring material, that is, to be present separately from the coloring material.

<Ink>

The ink according to the embodiment of the present invention is an aqueous ink for ink jet that contains a coloring material and a plurality of resins (first resin and second resin) different from the coloring material. The first resin is a resin particle formed of a first polyester resin. The second resin is at least one of (i) a block copolymer containing an A block having no acid group and a B block having an acid group and (ii) a second polyester resin having a sulfonic acid group. Hereinafter, the components constituting the ink of the present invention and physical properties of the ink will be described in detail.

(Coloring Material)

The ink contains a coloring material. This coloring material is different from both the first resin and the second resin. That is, the coloring material is not dispersed in at least one of the first resin and the second resin and is not included in the first resin or the second resin. In other words, the coloring material in the ink is distinguished from the first resin and the second resin and these materials are present separately.

Examples of the coloring material include pigments and dyes and among these, pigments are preferably used. Pigments, unlike dyes, are present in the form of a particle in the ink. For this reason, the abrasion resistance of an image recorded with an ink containing a pigment as the coloring material tends to be easily lowered. However, by containing the above-mentioned first resin, it is possible to effectively suppress the lowering of the abrasion resistance of the image even in a case where the pigment is used as the coloring material. In addition, in a case where an ink containing a dye as the coloring material is used, a problem of abrasion resistance tends to be less likely to occur than the case of the pigment ink. However, the fastness is easily enhanced while improving the glossiness without impairing the abrasion resistance by containing the above-mentioned first resin. The content (% by mass) of the coloring material in the ink is preferably 0.1% by mass or more to 15.0% by mass or less and more preferably 1.0% by mass or more to 10.0% by mass or less based on the total mass of the ink.

Specific examples of the pigment include inorganic pigments such as carbon black and titanium oxide; and organic pigments such as azo, phthalocyanine, quinacridone, isoindolinone, imidazolone, diketopyrrolopyrrole, dioxazine and perinone. Among the pigments, it is preferable to use carbon black or an organic pigment.

For a method of dispersing the pigment, a resin-dispersed pigment using a resin as a dispersant, a self-dispersible pigment in which a hydrophilic group is bonded to the particle surface of a pigment or the like can be used. In addition, a resin-bonded type pigment in which an organic group containing a resin is chemically bonded to the particle surface of a pigment, a microcapsule pigment in which the particle surface of a pigment is coated with a resin and the like can be used. Among these, it is preferable to use a resin-dispersed pigment in which a resin as a dispersant is physically adsorbed on the particle surface of the pigment, instead of a resin-bonded type pigment or a microcapsule pigment.

As the resin dispersant for dispersing the pigment in an aqueous medium, it is preferable to use a resin capable of dispersing the pigment in an aqueous medium by the action of an anionic group. It is preferable to use a water-soluble resin as the resin dispersant. This resin dispersant is a resin different from both the first resin and the second resin.

Examples of the resin dispersant include an acrylic resin and a urethane-based resin. Among these, an acrylic resin is preferable and an acrylic resin including units derived from (meth)acrylic acid and (meth)acrylic acid ester is more preferable.

As the acrylic resin, an acrylic resin having a hydrophilic unit and a hydrophobic unit as constituent units is preferable. Among these, a resin having a hydrophilic unit derived from (meth)acrylic acid and a hydrophobic unit derived from at least one of a monomer having an aromatic ring and a (meth)acrylic acid ester is preferable. In particular, a resin having a hydrophilic unit derived from (meth)acrylic acid and a hydrophobic unit derived from at least one monomer of styrene and α-methylstyrene is preferable. Since these resins easily interact with the pigment, these resins can be suitably used as a resin dispersant for dispersing the pigment.

The hydrophilic unit is a unit having a hydrophilic group such as an anionic group. The hydrophilic unit can be formed by polymerizing, for example, a hydrophilic monomer having a hydrophilic group. Specific examples of the hydrophilic monomer having a hydrophilic group include acidic monomers having a carboxylic acid group such as (meth)acrylic acid, itaconic acid, maleic acid and fumaric acid and anionic monomers such as anhydrides and salts of these acidic monomers. Examples of the cation constituting the salt of the acidic monomer include ions such as lithium, sodium, potassium, ammonium and organic ammonium. The hydrophobic unit is a unit that does not have a hydrophilic group such as an anionic group. The hydrophobic unit can be formed by polymerizing, for example, a hydrophobic monomer having no hydrophilic group such as an anionic group. Specific examples of the hydrophobic monomer include monomers having an aromatic ring such as styrene, α-methylstyrene and benzyl (meth)acrylate and (meth) acrylic acid ester-based monomers such as methyl (meth) acrylate, butyl (meth)acrylate and 2-ethylhexyl (meth)acrylate.

As the self-dispersible pigment, a pigment in which an anionic group such as a carboxylic acid group, a sulfonic acid group or a phosphonic acid group is bonded to the particle surface of a pigment directly or via another atomic group (—R—) can be used. The anionic group may be any of an acid type and a salt type and when the acid group is a salt type, the anionic group may be in a state in which a part of the anionic group is dissociated or in a state in which the whole of the anionic group is dissociated. In a case where the anionic group is a salt type, examples of the cation serving as a counter ion include an alkali metal cation, ammonium and organic ammonium. Specific examples of another atomic group (—R—) include a linear or branched alkylene group having 1 to 12 carbon atoms; an arylene group such as a phenylene group or a naphthylene group; a carbonyl group; an imino group; an amide group; a sulfonyl group; an ester group; and an ether group. In addition, a group obtained by combining these groups may also be used.

In a case where the ink contains the pigment, it is preferable that the content (% by mass) of the first resin in the ink is 0.5 times or more to 3.0 times or less the content (% by mass) of the pigment in terms of mass ratio (times). When the above ratio is less than 0.5 times, the amount of the first resin with respect to the pigment is too small and the degree to which the abrasion resistance of an image is improved may be lowered in some cases. On the other hand, when the above ratio is more than 3.0 times, the amount of the first resin that is softer than the pigment is too large. Therefore, the image is easily deformed by abrasion and the degree to which the abrasion resistance of the image is improved may be lowered in some cases.

As the dye, it is preferable to use a dye having an anionic group. Specific examples of the dye include dyes such as azo, triphenylmethane, (aza)phthalocyanine, xanthene and anthrapyridone.

(Plurality of Resins: First Resin and Second Resin)

The ink contains a plurality of resins (first resin and second resin, both described later). The content (% by mass) of the first resin in the ink is preferably 4.0 times or more to 100.0 times or less the content (% by mass) of the second resin in terms of mass ratio. When the above mass ratio is less than 4.0 times, the amount of the second resin with respect to the amount of the first resin is excessive. Thus, the second resin particle, which is not physically adsorbed onto the first resin, is easily associated with each other in the ink to form micelles. Then, the micelles may be aggregated due to concentration by evaporation of the aqueous medium from ink droplets or permeation into a recording medium and the first resin may also be aggregated in some cases. As a result, nonuniformity of the resin easily occurs in the recorded image and the degree of improvement in glossiness may be lowered in some cases. On the other hand, when the mass ratio is more than 100.0 times, the amount of the second resin with respect to the amount of the first resin is extremely small. For this reason, the leveling properties between the dots of the ink applied to the recording medium are lowered, macro unevenness is easily generated on the image surface and the degree of improvement in glossiness may be lowered in some cases.

(First Resin)

The first resin is a resin particle formed of a first polyester resin. It is preferable that the first polyester resin does not have a sulfonic acid group. The content (% by mass) of the first resin in the ink is preferably 0.1% by mass or more to 15.0% by mass or less and more preferably 1.0% by mass or more to 10.0% by mass or less based on the total mass of the ink. The resin particle as the first resin is present in the ink in a dispersed state, that is, in the form of a resin emulsion. It is preferable that the resin particle does not include the coloring material. The ratio (% by mass) of the first polyester resin in the resin forming the resin particle is preferably 80.0% by mass or more and more preferably 90.0% by mass or more based on the total mass of the resin. The ratio (% by mass) of the first polyester resin may be 100.0% by mass and is more preferably 99.5% by mass or less based on the total mass of the resin. That is, it is preferable that the resin particle as the first resin is substantially formed of only the first polyester resin except for a lightproof agent (the details will be described later) that may be included in the resin particle.

The term "resin particle" refers to a resin that is insoluble in the aqueous medium constituting the ink and specifically means a resin that can be present in the aqueous medium in a state in which a particle whose particle diameter can be measured by a dynamic light scattering method is formed. On the other hand, the term "water-soluble resin" refers to a resin that can be dissolved in the aqueous medium constituting the ink and specifically means a resin that can be present in the aqueous medium in a state in which a particle whose particle diameter can be measured by a dynamic light scattering method is not formed. The term "resin particle" can also be paraphrased as "water-dispersible resin (water-insoluble resin)".

Whether or not the resin is the "resin particle" can be determined according to the method shown below. First, a liquid containing the resin to be determined (resin solid content: 10% by mass) is prepared. Then, the liquid thus prepared is diluted to 10 times (based on volume) with ion exchange water to prepare a sample. Then, in a case where the particle diameter of the resin in the sample is measured by a dynamic light scattering method, when a particle having a particle diameter is measured, it is determined that the particle is the "resin particle" (water-dispersible resin). On the other hand, when a particle having a particle diameter is not measured, it is determined that the resin is not the "resin particle" (water-soluble resin). In this case, the measurement can be performed under the conditions of, for example, a SetZero of 30 seconds, a number of measurements of 3 times, a measurement time of 180 seconds, a shape of real spherical shape and a refractive index of 1.59. As the particle size distribution measuring apparatus, a particle size analyzer (for example, trade name "NANOTRAC UPA-EX150", manufactured by Nikkiso Co., Ltd.) by a dynamic light scattering method or the like can be used. Of course, the particle size distribution measuring apparatus and the measurement conditions are not limited thereto.

With respect to resins other than the first resin (other resins such as a resin dispersant and the second resin), whether or not the resin is the resin particle is also determined according to the above method. However, in order to make a simple determination, it is preferable to use a liquid containing a resin (resin content: 10% by mass) that is neutralized with an alkali (such as sodium hydroxide and potassium hydroxide) in an amount corresponding to the acid value for other resins.

[Constituent Material of Polyester Resin]

The resin particle as the first resin is formed of the first polyester resin. An unreacted hydroxy group or carboxylic acid group is present at the terminal of the polyester resin. A polyester resin usually includes a unit derived from a polyhydric alcohol and a unit derived from a polycarboxylic acid. The total of a ratio of the unit derived from a polyhydric alcohol (% by mass) and the ratio of the unit derived from a polycarboxylic acid (% by mass) in the first polyester resin is preferably 90.0% by mass or more. The total is more preferably 95.0% by mass or more and may be 100.0% by mass.

[Polyhydric Alcohol]

Examples of the polyhydric alcohol include polyhydric alcohols of dihydric to tetrahydric. Examples of the polyhydric alcohol include a polyhydric alcohol having an aliphatic group, a polyhydric alcohol having an aromatic group and a sugar alcohol. Specific examples of the polyhydric alcohol include dihydric alcohols such as ethylene glycol[1,2-ethanediol], neopentyl glycol[2,2-dimethyl-1,3-propanediol], 1,3-propanediol, 1,4-butanediol, benzenediol and 2,2-bis(4-hydroxyphenyl)propane [bisphenol A]; trihydric alcohols such as glycerin, trimethylolethane and trimethylolpropane; and tetrahydric alcohols such as pentaerythritol. As the polyhydric alcohol, an oligomer (a low molecular weight polymer having a molecular weight of 1,000 or less) can also be used. The ratio (% by mass) of the unit derived from the polyhydric alcohol in the first polyester resin is preferably 40.0% by mass or more to 60.0% by mass or less.

It is preferable to use a dihydric alcohol or a trihydric alcohol since the number average molecular weight of the obtained first polyester resin can be easily adjusted. As the polyhydric alcohol, it is preferable to use a polyhydric alcohol having an aromatic group from the viewpoint of enhancing the interaction with the second resin. Of these, it is preferable to use bisphenol A. In addition, a polyhydric alcohol having an aromatic group and a polyhydric alcohol having an aliphatic group may be used in combination. As the polyhydric alcohol having an aliphatic group, a linear or branched polyhydric alcohol having an aliphatic group having 1 to 6 carbon atoms is preferable. Of these, ethylene glycol, neopentyl glycol and glycerin are preferable.

[Polycarboxylic Acid]

Examples of the polycarboxylic acid include polycarboxylic acids of divalent to tetravalent. Examples of the polycarboxylic acid include a polycarboxylic acid having an aliphatic group, a polycarboxylic acid having an aromatic group and a nitrogen-containing polycarboxylic acid. Examples of the polycarboxylic acid include divalent carboxylic acids such as glutaric acid, adipic acid, terephthalic acid, isophthalic acid and 2,6-naphthalenedicarboxylic acid; trivalent carboxylic acids such as trimellitic acid; and tetravalent carboxylic acids such as ethylenediaminetetraacetic acid. As the polycarboxylic acid, an oligomer (a low molecular weight polymer having a molecular weight of 1,000 or less) can also be used. The ratio (% by mass) of the unit derived from the polycarboxylic acid in the first polyester resin is preferably 40.0% by mass or more to 60.0% by mass or less.

[Preferable Constituent Material]

It is preferable to use a divalent carboxylic acid or a trivalent carboxylic acid since the number average molecular weight and the acid value of the obtained first polyester resin can be easily adjusted. As the polyhydric alcohol, it is preferable to use the polycarboxylic acid having an aromatic group from the viewpoint of enhancing the interaction with the second resin. Of these, it is preferable to use adipic acid, terephthalic acid, isophthalic acid and trimellitic acid.

In the polyester resin containing a unit derived from a low molecular weight polyhydric alcohol and a unit derived from a low molecular weight polycarboxylic acid, the ratio of ester bonds included in the molecular chain is high as compared with a polyester resin containing a unit derived from a high molecular weight raw material. Therefore, it is preferable to use the first polyester resin containing a unit derived from a low molecular weight polyvalent alcohol or a unit derived from a low molecular weight polycarboxylic acid since it is possible to record an image having more excellent abrasion resistance. Therefore, the molecular weight of the polyhydric alcohol is preferably 50 or more to 300 or less. The molecular weight of the polycarboxylic acid is preferably 100 or more to 300 or less.

The valences of the polyhydric alcohol and the polycarboxylic acid are preferably divalent or trivalent. When the valences of the polyhydric alcohol and the polycarboxylic acid are tetravalent or more, the obtained first polyester resin has many branches and easily have a three-dimensionally complicated structure. Since the molecular chains of the first polyester resin are not easily brought into an entangled state on the recording medium, the degree of improvement in abrasion resistance may be lowered in some cases.

It is preferable that the first polyester resin contains a unit derived from an aromatic compound. Examples of the aromatic compound include a polyhydric alcohol having an aromatic group and a polycarboxylic acid having an aromatic group. Since the unit derived from an aromatic compound (the unit having an aromatic group) is contained in the first polyester resin, the first polyester resin that more strongly interacts with the second resin can be obtained. In addition, since the molecular chains of the first polyester resin containing the unit derived from an aromatic compound are more easily brought into an entangled state on the recording medium due to the hydrophobic interaction between the aromatic groups, the abrasion resistance of the image can be further improved. The ratio (% by mass) of the unit derived from an aromatic compound in the first polyester resin is preferably 25.0% by mass or more to 50.0% by mass or less based on the total mass of the first polyester resin. The ratio (% by mass) of the unit having no aromatic group in the first polyester resin is preferably 50.0% by mass or more to 75.0% by mass or less based on the total mass of the first polyester resin.

[Lightproof Agent]

It is preferable that the resin particle includes a lightproof agent. The state in which the resin particle includes a lightproof agent means a state in which the lightproof agent is present inside the three-dimensional structure formed by entangling the polyester resin. Examples of the lightproof agent include benzotriazoles, thioethers, triazines, benzoates, benzophenones, polyphenols, carotenes, sulfides and hindered amines. By using the resin particle including the lightproof agent, the light fastness of a recorded image can be enhanced. The ratio (% by mass) of the lightproof agent in the resin particle is preferably 0.5% by mass or more to 25.0% by mass or less based on the total mass of the resin particle. As a method of incorporating the lightproof agent in the resin particle, the same method can be used in a method of producing the resin particle, which will be described later, except that the lightproof agent is dissolved in an organic solvent together with the first polyester resin.

[Physical Properties of First Resin (Resin Particle and First Polyester Resin)]

[Amount of Carboxylic Acid Groups Present on Particle Surface of Resin Particle]

The amount of carboxylic acid groups present on the particle surface of the resin particle is preferably 30 μmol/g or more to 110 μmol/g or less. In the resin particle formed of a polyester resin having a carboxylic acid group, since at least a part of the carboxylic acid group is easily present in a state of being incorporated inside the particle, the amount of carboxylic acid groups exposed on the particle surface may be taken into consideration. When the amount of carboxylic acid groups present on the particle surface of the resin particle is less than 30 μmol/g, the repulsion of the electric charge generated between the plurality of carboxylic acid groups is weak and the resin particle may be rapidly aggregated due to concentration by evaporation of the aqueous medium from ink droplets or permeation into the recording medium in some cases. As a result, micro unevenness is easily generated on the surface of the recorded image and the degree of improvement in glossiness may be lowered in some cases. On the other hand, when the amount of carboxylic acid groups present on the particle surface of the resin particle is more than 110 μmol/g, the hydrophilicity of the resin particle is too high. Thus, the first polyester resin forming the resin particle is gradually dissolved in the ink and the viscosity of the ink may be increased. As a result, the leveling properties between the dots of the ink applied to the recording medium are lowered, macro unevenness is likely to occur on the image surface and the degree of improvement in glossiness may be lowered in some cases. The amount of carboxylic acid groups present on the particle surface of the resin particle can be measured by colloidal titration using a potential difference. The amount of acid groups other than the carboxylic acid group, such as a sulfonic acid group, present on the particle surface of the resin particle is preferably 5 μmol/g or less and more preferably 0 μmol/g.

[Acid Value of First Polyester Resin]

The acid value of the first polyester resin is preferably 2 mgKOH/g or more to 30 mgKOH/g or less. When the acid value of the first polyester resin is less than 2 mgKOH/g, the amount of carboxylic acid groups is too small and thus the resin particle may be rapidly aggregated due to concentration by evaporation of the aqueous medium from the ink droplets or permeation into the recording medium. As a result, micro unevenness is easily generated on the surface of the recorded image and the degree of improvement in glossiness may be lowered in some cases. On the other hand, when the acid value of the first polyester resin is more than 30 mgKOH/g, the amount of carboxylic acid groups is too large. Thus, the first polyester resin may be gradually dissolved in the ink and the viscosity of the ink may be increased. As a result, the leveling properties between the dots of the ink applied to the recording medium are lowered, macro unevenness is likely to occur on the image surface and the degree of improvement in glossiness may be lowered in some cases. The acid value of the first polyester resin block copolymer can be measured by neutralization titration using a potential difference. The acid value X (mgKOH/g) and the amount Y (μmol/g) of carboxylic acid groups can be converted by Expression: "X=Y×56.1/1,000".

[Number Average Molecular Weight of First Polyester Resin]

The number average molecular weight of the first polyester resin is preferably 3,000 or more to 30,000 or less. When the number average molecular weight of the first polyester resin is less than 3,000, the molecular chains are too short and not easily entangled. Thus, the degree of improvement in abrasion resistance may be lowered in some cases. On the other hand, when the number average molecular weight of the first polyester resin is more than 30,000, the molecular chain is too long, the molecular motion becomes difficult and the molecular chains are not easily the entangled. Therefore, the degree of improvement in abrasion resistance may be lowered in some cases. The number average molecular weight of the first polyester resin is a value in terms of polystyrene measured by gel permeation chromatography (GPC).

[Glass Transition Temperature of Resin Particle]

The glass transition temperature of the resin particle is preferably 40° C. or more to 120° C. or less. The glass transition temperature is a temperature at which the resin particle begins to change from a glass state to a viscous state and is a physical property value that is an index indicating the ease of softening of the resin particle. The higher the glass transition temperature, the harder the resin particle tends to be present near room temperature (25° C.). As the resin particle becomes harder, the resin particle is less easily deformed by an external force. Therefore, by using the resin particle having a high glass transition temperature, the strength of a resin layer formed on the recording medium by the first polyester resin can be improved and the abrasion resistance of the recorded image can be further improved. The glass transition temperature of the resin particle can be measured using a thermal analyzer such as a differential scanning calorimeter (DSC).

[Particle Diameter of Resin Particle]

The volume-based cumulative 50% particle diameter ($D_{50}$) of the resin particle is preferably 50 nm or more to 200 nm or less. In a case of considering a certain amount of the resin particle, the smaller the particle diameter, the larger the specific surface area and the larger the particle diameter, the smaller the specific surface area. When the $D_{50}$ of the resin particle is less than 50 nm, the specific surface area of the resin particle is increased, the contact chance between the resin particles is increased and the resin particle is easily rapidly aggregated due to concentration by evaporation of the aqueous medium from the ink droplets or penetration into a recording medium. As a result, micro unevenness is easily generated on the surface of the recorded image and the degree of improvement in glossiness may be lowered in some cases. On the other hand, when the $D_{50}$ of the resin particle is more than 200 nm, the dispersed state of the resin particle becomes unstable and the ink dots are not easily uniformly formed on the recording medium. As a result, macro unevenness is easily generated on the image surface and the degree of improvement in glossiness may be lowered in some cases. The volume-based cumulative 90% particle diameter ($D_{90}$) of the resin particle is preferably 70 nm or more to 280 nm or less.

The volume-based cumulative 50% particle diameter ($D_{50}$) of the resin particle is preferably 0.6 times or more to 0.8 times or less the volume-based cumulative 90% particle diameter ($D_{90}$) of the resin particle in terms of ratio (times). When the above ratio is less than 0.6 times, the particle diameter distribution of the resin particles is wide and there are many resin particles having significantly different particle sizes. When the resin particle having a large particle diameter collide with the resin particle having a small particle diameter, the resin particles are easily aggregated due to so-called heteroaggregation. As a result, micro unevenness is easily generated on the surface of the recorded image and the degree of improvement in glossiness may be lowered in some cases. The volume-based cumulative 50% particle diameter ($D_{50}$) and the volume-based cumulative 90% particle diameter ($D_{90}$) of the resin particle are particle diameters in which the percentages of particles are 50% or 90% when integrated from a small particle diameter side with the total volume of the measured particles as a reference in a particle diameter integration curve. The $D_{50}$ and $D_{90}$ of the resin particle can be measured by a dynamic light scattering method under the same conditions as the above-mentioned determination method for "whether or not the resin is the resin particle".

[Method of Producing Resin Particle]

The resin particle can be produced, for example, by synthesizing the first polyester resin and then granulating the first polyester resin. The first polyester resin can be obtained by, for example, reacting a polyhydric alcohol with a polycarboxylic acid (esterification reaction). If necessary, any of a polyhydric alcohol and a polycarboxylic acid may be added to carry out a so-called transesterification reaction in which a part of the ester bond is cleaved to adjust the molecular weight of the obtained first polyester resin. The polycarboxylic acid used in synthesizing the polyester resin may be a salt type (preferably an alkali metal salt type such as sodium salt) or an ester type (preferably an alkyl ester type).

For example, the amount of carboxylic acid groups of the first polyester resin to be obtained can be adjusted by adjusting the amount of the used raw material such that the number of moles of the carboxylic acid group of the polycarboxylic acid is larger than the number of moles of the hydroxy group of the polyhydric alcohol. The amount of carboxylic acid groups of the first polyester resin to be obtained can also be adjusted by adding a polycarboxylic acid during the transesterification reaction.

The esterification reaction is carried out in an atmosphere of an inert gas such as nitrogen gas. The reaction temperature during the esterification reaction is preferably 180° C. to 260° C. The reaction time of the esterification reaction is preferably 2.5 to 10 hours and more preferably 4 to 6 hours.

The pressure inside the reaction system may be reduced during the esterification reaction and the water generated in the esterification reaction may be discharged to the outside of the system to promote the esterification (dehydration condensation) reaction. The reaction in the reduced pressure state is carried out in an atmosphere of an inert gas such as nitrogen gas, following the esterification reaction. The reaction temperature in the reduced pressure state is preferably 220° C. to 280° C. The reaction time in the reduced pressure state is preferably 2.5 to 10 hours and more preferably 4 to 6 hours. The degree of pressure reduction (degree of vacuum) is preferably 1 Pa or more to 130 Pa or less. However, when the degree of pressure reduction is too low, the reaction efficiency is lowered and the number average molecular weight of the first polyester resin is reduced. Thus, it is preferable to adjust the degree of pressure reduction according to the desired reaction condition. It is preferable that the pressure is gradually reduced over a period of about 60 to 180 minutes from the atmospheric pressure (101,325 Pa) to 130 Pa or less.

The transesterification reaction is carried out to adjust the molecular weight of the first polyester resin by adding any of a polyhydric alcohol and a polycarboxylic acid to cleave a part of the ester bond. Since the number average molecular weight and the acid value of the first polyester resin are easily adjusted in a well-balanced manner, it is preferable to add trivalent or more valent polycarboxylic acids (among these, at least any one of trimellitic acid and trimellitic anhydride is preferable) to perform the transesterification reaction.

The transesterification reaction is also carried out in an atmosphere of an inert gas such as nitrogen gas, following the esterification reaction. The reaction temperature during the transesterification reaction is preferably 180° C. to 260° C. The reaction time in the transesterification reaction is preferably 1 to 5 hours. The transesterification reaction can be carried out in the presence of a catalyst or a heat stabilizer. Examples of the catalyst include zinc acetate, antimony trioxide, tetra-n-butyl titanate and n-butyl hydroxyoxytin. The amount (mol) of the catalyst used is preferably $1 \times 10^{-1}$ mol to $20 \times 10^{-4}$ mol with respect to 1 mol of the polyhydric alcohol or the polycarboxylic acid used in the transesterification reaction. Examples of the heat stabilizer include acids such as phosphoric acid and acid esters such as triethyl phosphate.

It is preferable that the synthesized first polyester resin is used in the next step of granulation after forming the resin into an appropriate form by pressurization, pulverization, or the like. Since the resin particle formed of the first polyester resin is used as a constituent component of the aqueous ink, it is preferable to perform granulation so that the resin particle is in the state of a dispersion liquid in which the resin particle is dispersed in an aqueous liquid medium (a liquid containing the resin particle). The aqueous liquid medium contains water such as deionized water, ion exchange water and distilled water as a main component and contains a water-soluble organic solvent as necessary. The content of water in the aqueous liquid medium is preferably 50% by mass or more and it is also preferable to use water that does not contain a water-soluble organic solvent.

As a method of forming a resin particle by granulating the first polyester resin, for example, a dispersion method and a phase inversion (emulsification) method can be used. Examples of the dispersion method include the methods (1) and (2) shown below.

(1) Method of dispersing the first polyester resin by adding a solution obtained by dissolving the first polyester resin in an organic solvent to an aqueous liquid medium (2) Method of dispersing the first polyester resin by dissolving the first polyester resin in an organic solvent, then adding an aqueous liquid medium thereto and mixing the components As the phase inversion (emulsification) method, a method in which in a process of adding an aqueous liquid medium to a solution obtained by dissolving the first polyester resin in an organic solvent to perform phase inversion from a solvent-based phase to a water-based phase, the first polyester resin is precipitated in the form of a particle may be used. In either the dispersion method or the phase inversion (emulsification) method, it is preferable to adjust the particle diameter of the resin particle to be obtained by granulating the resin while applying an appropriate shearing force using a known disperser. Since the amount of carboxylic acid groups present on the particle surface can be adjusted with high accuracy, it is preferable to produce the resin particle by the phase inversion (emulsification) method. Hereinafter, the method of producing the resin particle by the phase inversion (emulsification) method will be described.

A resin solution is prepared by dissolving the first polyester resin in an organic solvent capable of dissolving the first polyester resin. Examples of the organic solvent include ethers such as tetrahydrofuran and dibutyl ether; ketones such as acetone and methyl ethyl ketone; and alcohols such as isopropanol. When using only the organic solvent (such as methyl ethyl ketone) that has low water solubility in water and is immiscible at an arbitrary proportion, it may be difficult to adjust the amount of carboxylic acid groups present on the particle surface to be within a predetermined range in some cases. Accordingly, as the organic solvent, ethers such as tetrahydrofuran are preferably used since the solvent can be miscible with water at an arbitrary proportion. Ethers such as tetrahydrofuran are also preferable from the viewpoint of excellent solubility of the first polyester resin. When the concentration of the first polyester resin of the resin solution is diluted, it may be difficult to adjust the amount of carboxylic acid groups present on the particle surface to be within a predetermined range in some cases. Therefore, the content (% by mass) of the first polyester resin in the resin solution is preferably 20.0% by mass or more to 80.0% by mass or less and more preferably 30.0% by mass or more to 50.0% by mass or less.

Next, an aqueous liquid medium is gradually added to the prepared resin solution to precipitate a resin particle. Since the dispersed state of the resin particle can be kept stable, it is preferable to add a base before or during the addition of the aqueous liquid medium. Examples of the base include hydroxides of alkali metals such as sodium hydroxide and potassium hydroxide and ammonia. The base is preferably added in the form of an aqueous solution. There are cations in the system to which a base is added. In an attempt to neutralize the cation, the first polyester resin is granulated in a state in which the carboxylic acid group is positioned on the particle surface and a resin particle having a carboxylic acid group on the particle surface can be formed. That is, when the amount of the base in the system is adjusted, the amount of carboxylic acid groups present on the particle surface of the resin particle can be accurately adjusted. For example, the larger the amount of the base in the system, the larger the amount of carboxylic acid groups on the particle surface of the resin particle to be obtained. On the other hand, when the amount of the base in the system is small, the amount of carboxylic acid groups on the particle surface of the resin particle to be obtained is also small.

The amount of the base to be added can be controlled by the neutralization rate (mol %) based on the acid value of the first polyester resin. As the amount of the aqueous liquid medium added increases, the initially transparent resin solution gradually becomes cloudy and is emulsified to form a resin particle. The particle diameter and the particle size distribution of the resin particle to be obtained can be controlled by the content of the first polyester resin in the resin solution, the addition rate of the aqueous liquid medium, the shearing force at the time of dispersion and the like.

The emulsion containing the resin particle is depressurized to distill off the organic solvent and if necessary, the emulsion is filtered through a filter (stainless steel mesh) having an appropriate pore diameter to remove coarse particles. Then, a liquid containing the resin particle (an aqueous dispersion liquid of the resin particle) can be prepared by adding water to adjust the content of the resin particle. From the viewpoint of ink productivity, the content (% by mass) of the resin particle in the liquid containing the resin particle is preferably 10.0% by mass or more to 50.0% by mass or less and more preferably 20.0% by mass or more to 45.0% by mass or less.

[Analysis of Resin Particle]

The composition of the first polyester resin constituting the resin particle can be analyzed by, for example, the method shown below. First, a sample is prepared by dissolving the resin particle in an organic solvent, such as tetrahydrofuran, which can dissolve the resin particle. The resin particle to be dissolved in the organic solvent may be in a state of an aqueous dispersion liquid or in a dry state. By analyzing the prepared sample by an analytical method such as nuclear magnetic resonance (NMR) spectroscopy or matrix-assisted laser desorption ionization mass spectrometry (MALDI-MS), it is possible to know the types and ratios of the units (monomers) constituting the resin. In addition, by analyzing the resin particle by thermal decomposition gas chromatography, it is possible to detect the units (monomers) constituting the resin. In a case where an insoluble component that is not dissolved in the organic solvent is generated when preparing a sample, the generated insoluble component can be analyzed by thermal decomposition gas chromatography to detect a unit (monomer) constituting the resin. The second polyester resin, which will be described later, can also be analyzed by the same method as the first polyester resin.

(Second Resin)

The second resin is at least one of (i) a block copolymer containing an A block having no acid group and a B block having an acid group and (ii) a second polyester resin having a sulfonic acid group. The content (% by mass) of the second resin in the ink is preferably 0.1% by mass or more to 5.0% by mass or less and more preferably 0.5% by mass or more to 2.0% by mass or less based on the total mass of the ink. The block copolymer and the second polyester resin as the second resin may be present in the ink in a dissolved state or may be present in the ink in a dispersed state. In a case where the second resin is present in the ink in a dispersed state, that is, the second resin is present in the form of a resin particle, it is preferable that the second resin does not include the coloring material. Of these, it is preferable that the block copolymer is present in the ink in a dispersed state, that is, the block copolymer is present in the ink in the form of micelles. The second polyester resin is a water-soluble resin and is preferably present in the ink in a dissolved state. From the viewpoint of discharge characteristics, as the second resin, the block copolymer is more preferable than the second polyester resin.

(Second Resin (i): Block Copolymer)

[Constituent Material of Block Copolymer]

The block copolymer as the second resin includes an A block having no acid group and a B block having an acid group. The presence or absence of an acid group in the block can be adjusted by whether or not a known monomer having an acid group is used in the process of synthesizing each block. Each block can be formed of a known monomer. Each block may be a homopolymer formed only of a unit derived from a single monomer or may be a copolymer containing units derived from a plurality of monomers. Each block may include a plurality of segments. Specifically, the block copolymer may be a so-called A-B block copolymer including only one A block and one B block. In addition, the block copolymer may be a block copolymer including an A block including two segments A and a B block including one segment B. Further, the block copolymer may be a block copolymer including an A block including one segment A and a B block including two segments B.

[A Block]

The A block is a hydrophobic polymer block including a unit having no acid group. The segment A can be formed by (co)polymerizing one or more known monomers having no acid group.

Examples of the monomer for forming the A block include a monomer having an aromatic group such as styrene, vinyl toluene, α-methylstyrene or benzyl (meth)

acrylate; methyl (meth)acrylate, ethyl (meth)acrylate, propyl (meth)acrylate, butyl (meth)acrylate and 2-ethylhexyl (meth)acrylate; a (meth)acrylate ester (monomer having an aliphatic group) which may have a substituent such as an amino group, such as cyclohexyl (meth)acrylate, isobonyl (meth)acrylate or dimethylaminoethyl (meth)acrylate; and a (meth)acrylic acid derivative such as (meth)acrylonitrile or (meth)acrylamide.

When the interaction between the resin particle and the block copolymer is weak, the block copolymer may be desorbed from the resin particle in the ink and the viscosity of the ink may be easily increased. As a result, the leveling properties between the dots of the ink applied to the recording medium are lowered, macro unevenness is likely to occur on the image surface and the degree of improvement in glossiness may be lowered in some cases. Therefore, from the viewpoint of enhancing the interaction between the resin particle and the block copolymer, the A block preferably contains a unit derived from a monomer having an aromatic group. As the monomer having an aromatic group, styrene and benzyl (meth)acrylate are preferable.

[B Block]

The B block is a hydrophilic polymer block including a unit having an acid group. The B block can be formed by (co)polymerizing one or more known monomers including a monomer having an acid group. The segment B is preferably a copolymer containing two or more types of units and more preferably a random copolymer.

As the monomer having an acid group, a monomer having a carboxylic acid group is preferable and (meth)acrylic acid is more preferable. As the unit derived from the monomer for forming the B block, a unit derived from a monomer having no acid group can be further used. Examples of the monomer having no acid group include the same monomers as those exemplified as the monomer for forming the block A described above. As the monomer that becomes a unit forming the B block by polymerization, it is preferable to include the monomer having no acid group in addition to (meth)acrylic acid. The monomer having no acid group preferably contains a (meth)acrylic acid ester.

[Physical Properties of Block Copolymer]

[Acid Value of Block Copolymer]

The acid value of the block copolymer is preferably 50 mgKOH/g or more to 200 mgKOH/g or less. When the acid value of the block copolymer is less than 50 mgKOH/g, the amount of acid groups is too small and thus the block copolymers are easily associated with each other in the ink to form micelles. Then, the micelles may be aggregated due to concentration by evaporation of the aqueous medium from the ink droplets or permeation into the recording medium and the resin particle may also be aggregated in some cases. As a result, nonuniformity of the resin easily occurs in the recorded image and the degree of improvement in glossiness may be lowered in some cases. On the other hand, when the acid value of the block copolymer is more than 200 mgKOH/g, the amount of carboxylic acid groups is too large, so that the block copolymer may spread in the ink and the viscosity of the ink may increase. As a result, the leveling properties between the dots of the ink applied to the recording medium are lowered, macro unevenness is likely to occur on the image surface and the degree of improvement in glossiness may be lowered in some cases. The acid value of the block copolymer can be measured by neutralization titration using a potential difference. The acid value X (mgKOH/g) and the amount Y (µmol/g) of carboxylic acid groups can be converted by Expression: "$X=Y\times56.1/1{,}000$".

[Number Average Molecular Weight of Block Copolymer]

The number average molecular weight of the block copolymer is preferably 3,000 or more to 20,000 or less. When the number average molecular weight of the block copolymer is less than 3,000, the molecular chains of the block copolymer are not easily entangled with the molecular chains of other resins and thus the degree of improvement in abrasion resistance may be lowered in some cases. On the other hand, when the number average molecular weight of the block copolymer is more than 20,000, the viscosity of the ink may be increased. As a result, the leveling properties between the dots of the ink applied to the recording medium are lowered, macro unevenness is likely to occur on the image surface and the degree of improvement in glossiness may be lowered in some cases. The number average molecular weight of the block copolymer is a value in terms of polystyrene measured by gel permeation chromatography (GPC).

<Number Average Molecular Weight of a Block/Number Average Molecular Weight of Block Copolymer>

The number average molecular weight of the A block is preferably 0.30 times or more to 0.80 times or less the number average molecular weight of the block copolymer in terms of ratio. When the above ratio is less than 0.30 times, the ratio of the A block having no acid group is small and the ratio of the B block having an acid group is large, so that the interaction between the resin particle and the block copolymer becomes weak. As a result, the block copolymer may be desorbed from the resin particle in the ink and the viscosity of the ink may be increased. As a result, the leveling properties between the dots of the ink applied to the recording medium are lowered, macro unevenness is likely to occur on the image surface and the degree of improvement in glossiness may be lowered in some cases. On the other hand, when the above ratio is more than 0.80 times, the ratio of the A block having no acid group is large and the ratio of the B block having an acid group is small, so that the block copolymers are easily associated with each other in the ink to form micelles. Then, the micelles may be aggregated due to concentration by evaporation of the aqueous medium from the ink droplets or permeation into the recording medium and the resin particle may also be aggregated in some cases. As a result, nonuniformity of the resin easily occurs in the recorded image and the degree of improvement in glossiness may be lowered in some cases.

[Glass Transition Temperature of Block Copolymer]

The glass transition temperature of the block copolymer is preferably 40° C. or more to 120° C. or less. The glass transition temperature is a temperature at which the block copolymer begins to change from a glass state to a viscous state and is a physical property value that is an index indicating the ease of softening of the block copolymer. The higher the glass transition temperature, the harder the block copolymer tends to be present around room temperature (25° C.). As the block copolymer becomes harder, the resin particle is less easily deformed by an external force. Therefore, by using the block copolymer having a high glass transition temperature, the strength of a resin layer formed on the recording medium by the first polyester resin can be improved and the abrasion resistance of the recorded image can be further improved. The glass transition temperature of the block copolymer can be measured using a thermal analyzer such as a differential scanning calorimeter (DSC).

[Method of Producing Block Copolymer]

For example, the block copolymer can be produced by various living polymerization methods such as a living radical polymerization method, a living anion polymerization method and a living cationic polymerization method. Among these, it is preferable that the block copolymer is produced by a living radical polymerization method since the method is easily applicable to a general purpose monomer (particularly, a monomer having an aromatic group and (meth)acrylic acid ester) in the copolymer contained in the aqueous ink for ink jet. Examples of the living radical polymerization method include NMP method, ATRP method, RAFT method, TERP method, SBRP method, BIRP method, CMRP method and RTCP method.

In the living radical polymerization method, the polymerization rate of a first block is calculated from a dry solid content or the concentration of the residual monomer measured by gas chromatography and when the consumption of the monomer is confirmed, a monomer constituting a second block is added to allow the polymerization reaction to proceed. As a result, a diblock copolymer in which the first block and the second block are bonded can be obtained. In addition, by repeating the above operation a plurality of times, a block copolymer in which blocks including a plurality of segments are bonded can be obtained.

[Analysis of Block Copolymer]

The composition of the block copolymer can be analyzed by, for example, the method shown below. First, a sample is prepared by dissolving the block copolymer in an organic solvent, such as tetrahydrofuran, which can dissolve the block copolymer. The block copolymer to be dissolved in an organic solvent may be in an aqueous solution state or an aqueous dispersion state or may be in a dry state. However, the block copolymer is preferably in a dry state. By analyzing the prepared sample by an analytical method such as nuclear magnetic resonance (NMR) spectroscopy or matrix-assisted laser desorption ionization mass spectrometry (MALDI-MS), it is possible to know the types and ratios of the units (monomers) constituting the resin. In addition, by analyzing the block copolymer by thermal decomposition gas chromatography, it is possible to detect the units (monomers) constituting the resin. In a case where an insoluble component that is not dissolved in the organic solvent is generated when preparing a sample, the generated insoluble component can be analyzed by thermal decomposition gas chromatography to detect a unit (monomer) constituting the resin. Whether or not the resin has blocking properties can be determined from confirmation of unit continuity in matrix-assisted laser desorption ionization mass spectrometry (MALDI-MS).

(Second Resin (ii): Second Polyester Resin)

[Constituent Material of Second Polyester Resin]

The second polyester resin having a sulfonic acid group as the second resin is a polyester resin obtained by incorporating a sulfonic acid group in a polyester resin including a unit derived from a polyhydric alcohol and a unit derived from a polycarboxylic acid. Suitably, the polyester resin containing a unit derived from a polycarboxylic acid having a sulfonic acid group can be used. Hereinafter, unless otherwise specified, the "polycarboxylic acid" used as the raw material of the second polyester resin includes the meanings of both "a polycarboxylic acid having no sulfonic acid group" and "a polycarboxylic acid having a sulfonic acid group". The total of the ratio of the unit derived from the polyhydric alcohol (% by mass) and the ratio of the unit derived from the polycarboxylic acid (% by mass) in the second polyester resin is preferably 90.0% by mass or more. The total is more preferably 95.0% by mass or more and may be 100.0% by mass.

[Polyhydric Alcohol]

Examples of the polyhydric alcohol include the same polyhydric alcohols as those exemplified as the polyhydric alcohol for forming the first polyester resin described above. The ratio (% by mass) of the unit derived from the polyhydric alcohol in the second polyester resin is preferably 40.0% by mass or more to 60.0% by mass or less.

[Polycarboxylic Acid Having No Sulfonic Acid Group]

Examples of the polycarboxylic acid having no sulfonic acid group include the same polycarboxylic acids as those exemplified as the polycarboxylic acid for forming the first polyester resin described above. The ratio (% by mass) of the unit derived from the polycarboxylic acid having no sulfonic acid group in the second polyester resin is preferably 10.0% by mass or more to 55.0% by mass or less.

[Polycarboxylic Acid Having Sulfonic Acid Group]

Examples of the polycarboxylic acid having a sulfonic acid group include polycarboxylic acids of divalent to tetravalent. Examples of the polycarboxylic acid having a sulfonic acid group include a polycarboxylic acid having an aliphatic group, a polycarboxylic acid having an aromatic group and a nitrogen-containing polycarboxylic acid. Examples of the polycarboxylic acid having a sulfonic acid group include sulfosuccinic acid, 5-sulfoisophthalic acid, sulfoterephthalic acid, 4-sulfophthalic acid and 4-sulfonaphthalene-2,7-dicarboxylic acid. As the polycarboxylic acid, an oligomer (a low molecular weight polymer having a molecular weight of 1,000 or less) can also be used. In addition, in a case where the second polyester resin is produced by a transesterification reaction, an esterified product can be used as the polycarboxylic acid. The ratio (% by mass) of the unit derived from the polycarboxylic acid having a sulfonic acid group in the second polyester resin is preferably 1.0% by mass or more to 40.0% by mass or less.

[Preferable Constituent Materials]

As the preferable constituent materials, the same materials as those exemplified as the preferable constituent materials for forming the above-mentioned first polyester resin can be used. Unlike the first resin, the second polyester resin is preferably a water-soluble resin present in the ink in a dissolved state and thus it is preferable that the second polyester resin has higher hydrophilicity than the first polyester resin.

It is preferable to use a divalent carboxylic acid or a trivalent carboxylic acid since the number average molecular weight and the acid value of the second polyester resin to be obtained are easily adjusted. As the polyhydric alcohol having a sulfonic acid group, it is preferable to use a polycarboxylic acid having an aromatic group from the viewpoint of enhancing the interaction with the first resin. That is, it is preferable that the second polyester resin contains a unit derived from an aromatic compound. Examples of the aromatic compound include a polyhydric alcohol having an aromatic group and a polycarboxylic acid having an aromatic group (and a sulfonic acid group). As the polycarboxylic acid having an aromatic group (and a sulfonic acid group), it is preferable to use terephthalic acid, isophthalic acid, trimellitic acid, 5-sulfoisophthalic acid, sulfoterephthalic acid and 4-sulfophthalic acid. The ratio (% by mass) of the unit derived from the aromatic compound in the second polyester resin is preferably 25.0% by mass or more to 50.0% by mass or less based on the total mass of the second polyester resin. The ratio (% by mass) of the unit having no aromatic group in the second polyester resin is preferably 50.0% by mass or more to 75.0% by mass or less based on the total mass of the second polyester resin.

[Physical Properties of Second Polyester Resin]
[Amount of Sulfonic Acid Groups/Amount of Carboxylic Acid Groups]

It is preferable that the second polyester resin further has a carboxylic acid group and the amount of sulfonic acid group of the second polyester resin is 0.08 times or more to 0.50 times or less the amount of carboxylic acid group of the second polyester resin in terms of molar ratio. When the above ratio is less than 0.08 times, the ratio of the sulfonic acid group that causes ion dissociation and electrical repulsion in the aqueous ink is low and thus the second polyester resins are easily associated with each other in the ink to form micelles. Then, the micelles may be aggregated due to concentration by evaporation of the aqueous medium from ink droplets or permeation into a recording medium and the first resin may also be aggregated in some cases. As a result, nonuniformity of the resin easily occurs in the recorded image and the degree of improvement in glossiness may be lowered in some cases. On the other hand, when the above ratio is more than 0.50 times, the ratio of the sulfonic acid groups is too large and thus the interaction between the first resin and the second polyester resin becomes weak. Thus, the second polyester resin may be desorbed from the first resin in the ink and the viscosity of the ink may be increased. As a result, the leveling properties between the dots of the ink applied to the recording medium are lowered, macro unevenness is likely to occur on the image surface and the degree of improvement in glossiness may be lowered in some cases.

[Acid Value of Second Polyester Resin]

The acid value of the second polyester resin is preferably 2 mgKOH/g or more to 30 mgKOH/g or less. When the acid value of the second polyester resin is less than 2 mgKOH/g, the amount of acid groups is too small and the resin particle may be rapidly aggregated due to concentration by evaporation of the aqueous medium from the ink droplets or permeation into the recording medium in some cases. As a result, micro unevenness is easily generated on the surface of the recorded image and the degree of improvement in glossiness may be lowered in some cases. On the other hand, when the acid value of the second polyester resin is more than 30 mgKOH/g, the amount of acid groups is too large. Thus, the second polyester resin may be gradually dissolved in the ink and the viscosity of the ink may be increased. As a result, the leveling properties between the dots of the ink applied to the recording medium are lowered, macro unevenness is likely to occur on the image surface and the degree of improvement in glossiness may be lowered in some cases. The acid value of the second polyester resin can be measured by neutralization titration using a potential difference. The acid value X (mgKOH/g) and the amount Y (µmol/g) of acid groups can be converted by Expression: "$X=Y\times 56.1/1,000$".

[Number Average Molecular Weight of Second Polyester Resin]

The number average molecular weight of the second polyester resin is preferably 5,000 or more to 40,000 or less. When the number average molecular weight of the second polyester resin is less than 5,000, the molecular chains of the second polyester resin are not easily entangled with the molecular chains of other resins and thus the degree of improvement in abrasion resistance may be lowered in some cases. On the other hand, when the number average molecular weight of the second polyester resin is more than 20,000, the viscosity of the ink may be increased. As a result, the leveling properties between the dots of the ink applied to the recording medium are lowered, macro unevenness is likely to occur on the image surface and the degree of improvement in glossiness may be lowered in some cases. The number average molecular weight of the second polyester resin is a value in terms of polystyrene measured by gel permeation chromatography (GPC).

[Glass Transition Temperature of Second Polyester Resin]

The glass transition temperature of the second polyester resin is preferably 40° C. or more to 120° C. or less. The glass transition temperature is a temperature at which the second polyester resin begins to change from a glass state to a viscous state and is a physical property value that is an index indicating the ease of softening of the second polyester resin. The higher the glass transition temperature, the harder the second polyester resin tends to be present near room temperature (25° C.). As the second polyester resin becomes harder, the second polyester resin is less easily deformed by an external force. Therefore, by using the second polyester resin having a high glass transition temperature, the strength of a resin layer formed on the recording medium by the first polyester resin can be improved and the abrasion resistance of the recorded image can be further improved. The glass transition temperature of the second polyester resin can be measured using a thermal analyzer such as a differential scanning calorimeter (DSC).

[Method of Producing Second Polyester Resin]

Unlike the first resin, the second polyester resin is preferably a water-soluble resin that is present in the ink in a dissolved state. Examples of the method for producing the second polyester resin include the same methods as those exemplified for the above-mentioned method of producing the first resin and post-treatment except that the resin is made water-soluble. Specifically, when at least a part of the polycarboxylic acid is replaced with a polycarboxylic acid having a sulfonic acid group, a second polyester resin having a sulfonic acid group can be synthesized.

(Aqueous Medium)

The ink according to the present invention is an aqueous ink containing at least water as an aqueous medium. The ink contains an aqueous medium which is water or a mixed solvent of water and a water-soluble organic solvent. As the water, a deionized water or ion exchange water is preferably used. The content (% by mass) of the water in the aqueous ink is preferably 50.0% by mass or more to 95.0% by mass or less based on the total mass of the ink. In addition, the content (% by mass) of the water-soluble organic solvent in the aqueous ink is preferably 3.0% by mass or more to 50.0% by mass or less based on the total mass of the ink. As the water-soluble organic solvent, any solvent that can be used for an ink for ink jet, such as alcohols, (poly)alkylene glycols, glycol ethers, nitrogen-containing compounds and sulfur-containing compounds, can be used.

(Other Components)

The ink may contain polyhydric alcohols such as trimethylolpropane and trimethylolethane; urea derivatives such as urea and ethyleneurea; and a water-soluble organic compound which is solid at 25° C., in addition to the above components, if necessary. The ink may contain various additives such as a surfactant, a pH regulator, a viscosity modifier, a rust inhibitor, a preservative, a fungicide, an antioxidant, a reduction inhibitor and a chelate in addition to the above components, if necessary. In a case where a surfactant is contained in the ink, the content (% by mass) of the surfactant in the ink is preferably 0.1% by mass or more to 5.0% by mass or less and more preferably 0.1% by mass or more to 2.0% by mass or less based on the total mass of the ink.

(Physical Properties of Ink)

The viscosity of the ink at 25° C. is preferably 1.0 mPa-s or more to 10.0 mPa-s or less, more preferably 1.0 mPa-s or more to 5.0 mPa-s or less and particularly preferably 1.0 mPa-s or more to 3.0 mPa-s or less. The surface tension of the ink at 25° C. is preferably 10 mN/m or more to 60 mN/m or less, more preferably 20 mN/m or more to 60 mN/m or less and particularly preferable 30 mN/m or more to 50 mN/m or less. The pH of the ink at 25° C. is preferably 5.0 or more to 10.0 or less and more preferably 7.0 or more to 9.5 or less.

<Ink Cartridge>

An ink cartridge according to the present invention includes an ink and an ink storage portion that stores the ink. The ink contained in the ink storage portion is the aqueous ink of the present invention described above. FIG. 1 is a cross-sectional view schematically illustrating an exemplary embodiment of an ink cartridge of the present invention. As illustrated in FIG. 1, an ink supply port 12 for supplying an ink to a recording head is arranged on the bottom surface of the ink cartridge. The inside of the ink cartridge is an ink storage portion for storing the ink. The ink storage portion includes an ink storage chamber 14 and an absorber storage chamber 16 and the chambers communicate with each other through a communication port 18. In addition, the absorber storage chamber 16 communicates with the ink supply port 12. While a liquid ink 20 is stored in the ink storage chamber 14, absorbers 22 and 24 each holding the ink in a state of being impregnated therewith are stored in the absorber storage chamber 16. The ink storage portion may be of a form that is free of the ink storage chamber that stores the liquid ink and holds the total amount of the ink to be stored with the absorbers. In addition, the ink storage portion may be of a form that is free of any absorber and stores the total amount of the ink in a liquid state. Further, an ink cartridge of a form formed to have an ink storage portion and a recording head may be adopted.

<Ink Jet Recording Method>

An ink jet recording method according to the present invention is a method including ejecting the aqueous ink of the present invention described above from an ink jet recording head to record an image on a recording medium. Examples of a system of ejecting an ink include a system of applying a mechanical energy to an ink and a system of applying a thermal energy to an ink. In the present invention, it is particularly preferable to employ a system of ejecting an ink by applying a thermal energy to the ink. Steps of the ink jet recording method may be those publicly known except that the ink according to the present invention is used. A step of heating an image (ink) may be carried out after the ink is applied to a recording medium and the image is recorded. The heating temperature at this time can be appropriately set to be equal to or more than the glass transition temperature of the resin particle constituting the image. The upper limit of the temperature is not particularly limited, but is preferably 120° C. or less.

Figure 2A:
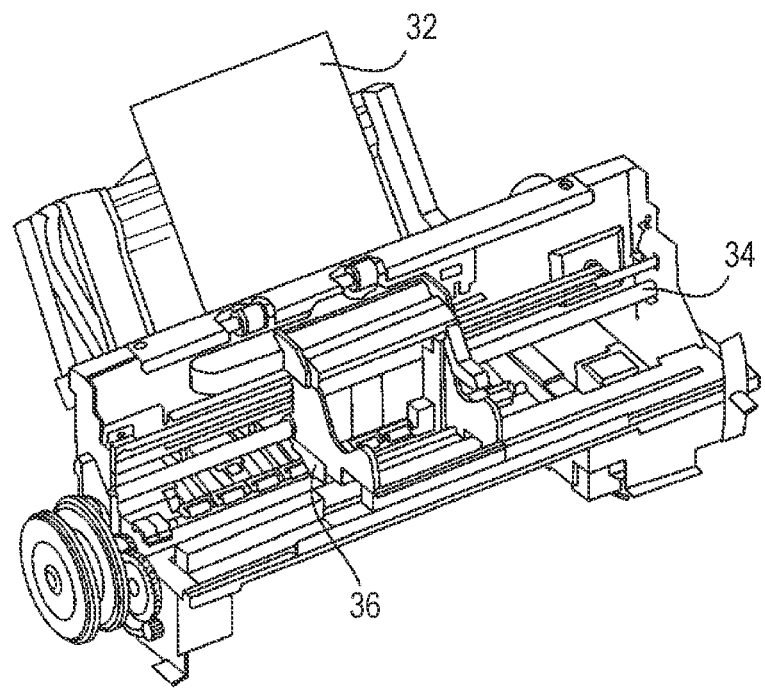
FIG. 2A is a perspective view of a principal part of an ink jet recording apparatus used in an ink jet recording method according to the present invention.
Figure 2B:
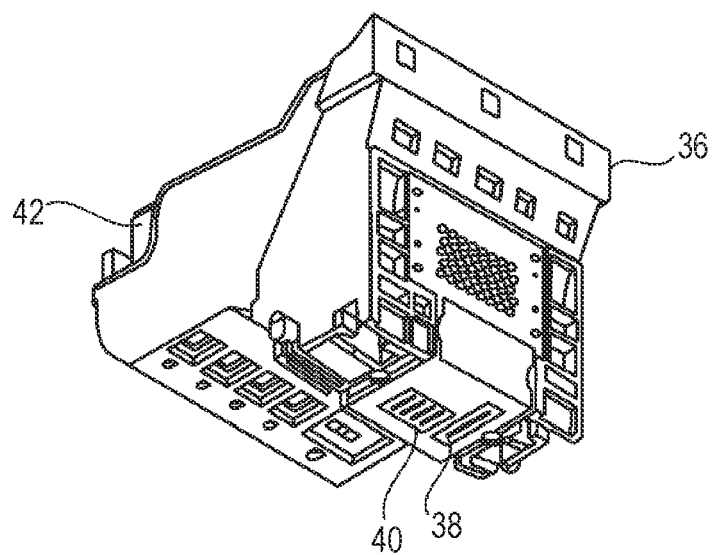
FIG. 2B is a perspective view of a head cartridge of an ink jet recording apparatus used in the ink jet recording method according to the present invention.

FIGS. 2A and 2B are views schematically illustrating an example of an ink jet recording apparatus used in an ink jet recording method according to the present invention, FIG. 2A is a perspective view of a principal part of the ink jet recording apparatus and FIG. 2B is a perspective view illustrating a head cartridge. In the ink jet recording apparatus, a conveyance unit (not shown) that conveys a recording medium 32 and a carriage shaft 34 are provided. A head cartridge 36 can be mounted on the carriage shaft 34. The head cartridge 36 includes recording heads 38 and 40 and is configured such that an ink cartridge 42 is set. The ink (not illustrated) is ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32. As the recording medium 32, it is preferable to use, for example, a recording medium having no coating layer such as plain paper or a recording medium having a coating layer such as glossy paper, mat paper or printing paper. Examples of the base material of these recording media include paper, film and plastic.

EXAMPLES

Hereinafter, the present invention will be described in more detail by way of Examples and Comparative Examples. However, the present invention is not intended to be limited to the following examples as long as the present invention does not depart from its gist. In the description of the amounts of components, "part(s)" and "%" are based on mass unless otherwise specified.

<Measuring Method of Physical Property Value>

(Amount of Carboxylic Acid Groups on Particle Surface of Resin Particle)

A liquid containing a resin particle was used as a sample and the amount of carboxylic acid groups on the particle surface of the resin particle was measured by colloidal titration using the potential difference. In the colloidal titration, a potential difference automatic titrator (trade name "AT510", manufactured by Kyoto Electronics Manufacturing Co., Ltd.) on which a flow potential titration unit (trade name "PCD-500", manufactured by Kyoto Electronics Manufacturing Co., Ltd.) was mounted was used. As a titration reagent, a 0.005 mol/L methyl glycol chitosan solution was used.

(Acid Value of Resin)

The acid values of the polyester resin and the block copolymer were measured according to the following procedure. The resin was separated from a liquid containing the resin (polyester resin or block copolymer) and washed with 1.0 mol/L hydrochloric acid and water. The washed resin was added to 60 mL of a liquid in which water and tetrahydrofuran were mixed at a mass ratio of 1:6 and the resin was dissolved at 25° C. to prepare a sample. The prepared sample was neutralized and titrated and the acid value of the resin was measured. In the neutralization titration, a potential difference automatic titrator (trade name "AT510", manufactured by Kyoto Electronics Manufacturing Co., Ltd.) on which a composite glass electrode (trade name "C-171", manufactured by Kyoto Electronics Manufacturing Co., Ltd.) was mounted was used. As a titration reagent, a 0.5 mol/L potassium hydroxide ethanol solution was used.

(Number Average Molecular Weight of Resin)

According to the following procedure, the number average molecular weight of the resin and the number average molecular weight of the A block of the block copolymer were measured. The polyester resin and the A block or block copolymer was added to tetrahydrofuran and the mixture was stirred at 25° C. for 24 hours to dissolve the resins and then filtered through a membrane filter to obtain a sample. The resin content in the sample was adjusted to be about 0.3%. The prepared sample was analyzed by gel permeation chromatography according to the following conditions and the number average molecular weight was calculated using a molecular weight calibration curve prepared using a standard polystyrene resin. As the standard polystyrene resin, trade names "TSK STANDARD POLYSTYRENE F-850, F-450, F-288, F-128, F-80, F-40, F-20, F-10, F-4, F-2, F-1, A-5000, A-2500, A-1000 and A-500, manufactured by Tosoh Corporation, were used.

HPLC apparatus: Trade name "2695 Separations Module" (manufactured by Waters Corporation)
Differential refractive index (RI) detector: Trade name "2414 detector" (manufactured by Waters Corporation)
Column: Four continuous columns of trade name "GPC KF-806M" (manufactured by Showa Denko K. K.)
Eluent: Tetrahydrofuran
Flow rate: 1.0 mL/min
Oven temperature: 40° C.
Sample injection amount: 100 µL (Glass Transition Temperature of First Resin)

2 mg of the resin particle obtained by drying the liquid containing the resin particle at 60° C. was placed in an aluminum container and sealed and a sample for measurement was prepared. Using a differential scanning calorimeter (trade name "Q1000", manufactured by TA instruments), thermal analysis was performed on the prepared sample according to the temperature program shown below to create a temperature rise curve. In the created temperature rise curve (horizontal axis: temperature, vertical axis: calorific value), the temperature at the intersection of the straight line extending to the high temperature side and passing through two points in the curve on the low temperature side and the tangent line drawn at the point where the slope of the stepped change portion in the curve was maximized was set to the "glass transition temperature of the resin particle".

[Temperature Program]:
(1) Temperature rise to 200° C. at 10° C./min
(2) Temperature drop from 200° C. to −50° C. at 5° C./min
(3) Temperature rise from −50° C. to 200° C. at 10° C./min (Determination of Whether or Not Resin is Resin Particle and Particle Diameter)

The liquid containing the resin was diluted with ion exchange water to prepare a sample having a resin content of about 1.0%. For this sample, the particle diameter (volume-based cumulative 50% particle diameter $D_{50}$, volume-based cumulative 90% particle diameter $D_{90}$) of the resin particle was measured according to the following conditions shown below using a particle size distribution meter (trade name "Nanotrack WAVEII-Q", manufactured by Microtrac-BEL Corp.) by a dynamic light scattering method. In a case where a particle having a particle diameter was measured by this measuring method, it was determined that the resin was the "resin particle" ("water-dispersible resin"). On the other hand, in a case where a particle having a particle diameter was not measured by this measuring method, it was determined that the resin was not "resin particle" ("water-soluble resin").

[Measurement Conditions]
SetZero: 30 s
Number of times of measurement: 3 times
Measurement time: 180 seconds
Shape: true sphere
Refractive index: 1.6
Density: 1.0

(Viscosity of Ink)

A rotor (1° 34'×R24) attached was mounted to an E-type viscometer (trade name "RE80-L", manufactured by Toki Sangyo) that circulates an antifreeze solution in a constant temperature tank set at 25° C. through a tube. The viscosity of the ink was measured using this apparatus.

<First Resin: Synthesis of Resin Particle Formed of Polyester Resin>

(First Polyester Resin)

A mixture of the components (units: parts) shown in the item of "Esterification reaction" in Table 1 was placed in a reaction vessel placed in an autoclave and heated at 220° C. for 4 hours to carry out an esterification reaction. Then, the temperature was raised to 240° C. and the pressure was reduced to 13 Pa over 90 minutes. After continuing the esterification (dehydration condensation) reaction while maintaining the reduced pressure state at 240° C. and 13 Pa for 5 hours, nitrogen gas was introduced to return the pressure to normal pressure. After lowering the temperature to 220° C., a catalyst (tetra-n-butyl titanate) and the components (unit: part) shown in the item "Transesterification reaction" in Table 1 were added and the mixture was heated at 220° C. for 2 hours to carry out a transesterification reaction. The amount of catalyst used (mol) was "$3 \times 10^{-4} \times$ total amount of polycarboxylic acid used (mol)". Then, nitrogen gas was introduced to set a pressurized state and the sheet-shaped resin was taken out. The removed resin was cooled to 25° C. and then pulverized using a crusher to obtain a polyester resin. The characteristics of the obtained polyester resin are shown in Table 1. The meanings of the abbreviations in Table 1 are EG: Ethylene glycol, NPG: Neopentyl glycol, BPA: Bisphenol A, GLY: Glycerin, tPA: Terephthalic acid, iPA: Isophthalic acid, BTA: Trimellitic acid and HAD: Adipic acid.

TABLE 1

Synthesis conditions and characteristics of first polyester resin

| | | Synthesis conditions | | | | | | | | | | | Characteristics | |
|---|---|---|---|---|---|---|---|---|---|---|---|---|---|---|
| | | Esterification reaction | | | | | | | Transesterification reaction | | Total amount used | | Acid value (mgKOH/g) | Number average molecular weight |
| | | EG | NPG | BPA | GLY | tPA | iPA | BTA | HAD | BTA | HAD | Polyhydric alcohol | Polycarboxylic acid | | |
| Polyester resin | 1 | 90.0 | | 10.0 | | 50.0 | 50.0 | 7.6 | | 2.4 | | 100.0 | 110.0 | 7 | 11,800 |
| | 2 | | 90.0 | 10.0 | | 50.0 | 50.0 | 7.6 | | 2.4 | | 100.0 | 110.0 | 7 | 11,800 |
| | 3 | 90.0 | | | 10.0 | 50.0 | 50.0 | 7.6 | | 2.4 | | 100.0 | 110.0 | 7 | 11,800 |
| | 4 | 90.0 | | 10.0 | | 50.0 | 50.0 | | 7.6 | | 2.4 | 100.0 | 110.0 | 7 | 11,800 |
| | 5 | 90.0 | 30.0 | | | 40.0 | 40.0 | 7.6 | | 2.4 | | 120.0 | 90.0 | 1 | 11,800 |
| | 6 | 90.0 | 20.0 | | | 45.0 | 45.0 | 7.6 | | 2.4 | | 110.0 | 100.0 | 2 | 11,800 |
| | 7 | 80.0 | | 10.0 | | 50.0 | 50.0 | 6.1 | | 3.9 | | 90.0 | 110.0 | 30 | 3,400 |
| | 8 | 80.0 | | 10.0 | | 50.0 | 50.0 | 6.0 | | 4.0 | | 90.0 | 110.0 | 35 | 2,800 |

TABLE 1-continued

Synthesis conditions and characteristics of first polyester resin

| | | | | Synthesis conditions | | | | | | | | | Characteristics | |
|---|---|---|---|---|---|---|---|---|---|---|---|---|---|---|
| | | | | | | | | | Transesterification | | Total amount used | | | Number average |
| | | | | Esterification reaction | | | | | reaction | | Polyhydric | Polycarboxylic | Acid value | molecular |
| | EG | NPG | BPA | GLY | tPA | iPA | BTA | HAD | BTA | HAD | alcohol | acid | (mgKOH/g) | weight |
| 9 | 50.0 | 50.0 | | | | | | 107.6 | | 2.4 | 100.0 | 110.0 | 7 | 11,800 |
| 10 | 90.0 | | 10.0 | | 45.0 | 45.0 | 7.6 | | 2.4 | | 100.0 | 100.0 | 5 | 11,800 |
| 11 | 90.0 | | 10.0 | | 50.0 | 50.0 | 7.2 | | 2.8 | | 100.0 | 110.0 | 9 | 9,500 |
| 12 | 90.0 | | 10.0 | | 31.5 | 31.5 | 7.6 | 37.0 | 2.4 | | 100.0 | 110.0 | 7 | 11,800 |
| 13 | 90.0 | | 10.0 | | 33.5 | 33.0 | 7.6 | 33.5 | 2.4 | | 100.0 | 110.0 | 7 | 11,800 |
| 14 | | | 100.0 | | 50.0 | 50.0 | 7.6 | | 2.4 | | 100.0 | 110.0 | 7 | 11,800 |

<Production of First Resin>
(First Resins 1 to 30)

A stirrer (trade name "TORNADO STIRRER STANDARD SM-104", manufactured by AS ONE Corporation) was set in a beaker having a volume of 2 L. The types and amounts (unit: g) of the polyester resin, the organic solvent and the lightproof agent shown in Table 2 were placed in the beaker and the components were dissolved by stirring at 25° C. Next, a 5% aqueous sodium hydroxide solution in an amount corresponding to the neutralization rate (mol %) based on the acid value of the polyester resin was added and the mixture was stirred for 30 minutes. Further, 900 g of ion exchange water was added dropwise at a rate of 20 mL/min while stirring at 10° C. at the stirring rate shown in Table 2. Then, the temperature was raised to 60° C. and the organic solvent and some water were depressurized and distilled off. The beaker was placed in a water bath and a heat treatment was performed by stirring at 85° C. for the heat treatment time shown in Table 2. After filtering the contents with a wire mesh of 150 mesh, an appropriate amount of ion exchange water was added to obtain a liquid containing each first resin having a resin particle content of 25.0%. Table 2 shows the characteristics of the obtained liquid containing the first resin and the first resin. In Table 2, the "Amount of carboxylic acid groups (μmol/g)" indicates the amount of carboxylic acid groups present on the particle surface of the resin particle. The meanings of the abbreviations for lightproof agents and organic solvents in Table 2 are shown below.

Lightproof agent 1: Benzotriazole-based lightproof agent (trade name "ADEKA STUB LA-31RG", manufactured by ADEKA Corporation)

Lightproof agent 2: Thioether-based lightproof agent (trade name "ADEKA Stub AO-503", manufactured by ADEKA Corporation)

Lightproof agent 3: Triazine-based lightproof agent (trade name "ADEKA STAB LA-46", manufactured by ADEKA Corporation)

Lightproof agent 4: Benzophenone-based lightproof agent (trade name "ADEKA STAB 1413", manufactured by ADEKA Corporation)

Lightproof agent 5: Hindered amine-based lightproof agent (trade name "ADEKA STAB LA-63P", manufactured by ADEKA Corporation)

THF: Tetrahydrofuran
MEK: Methyl ethyl ketone
IPA: Isopropanol

TABLE 2

Production conditions and characteristics of first resin

| | | | | Production conditions | | | | | | | | | Characteristics | | | | |
|---|---|---|---|---|---|---|---|---|---|---|---|---|---|---|---|---|---|
| | Type of polyester resin | Polyester resin | Lightproof agent | | | | | Organic solvent | | | Neutralization rate | Conditions | | | | | Glass transition temperature |
| | | | 1 | 2 | 3 | 4 | 5 | THF | MEK | IPA | | Stirring rate | Heat treatment | $D_{50}$ | $D_{90}$ | $D_{50}/D_{90}$ | Amount of carboxylic acid groups |
| | | | | | | | | | | | (mol %) | (rpm) | (hours) | (nm) | (nm) | (times) | (μmol/g) | (° C.) |
| First resin 1 | 1 | 210.0 | | | | | | 390.0 | | | 80 | 150 | 1 | 120 | 170 | 0.7 | 65 | 86 |
| 2 | 2 | 210.0 | | | | | | 390.0 | | | 80 | 150 | 1 | 120 | 170 | 0.7 | 64 | 64 |
| 3 | 3 | 210.0 | | | | | | 390.0 | | | 80 | 150 | 1 | 120 | 170 | 0.7 | 66 | 80 |
| 4 | 4 | 210.0 | | | | | | 390.0 | | | 80 | 150 | 1 | 120 | 170 | 0.7 | 63 | 76 |
| 5 | 1 | 210.0 | | | | | | 195.0 | 195.0 | | 80 | 150 | 1 | 120 | 170 | 0.7 | 65 | 86 |
| 6 | 1 | 210.0 | | | | | | 195.0 | | 195.0 | 80 | 150 | 1 | 120 | 170 | 0.7 | 65 | 86 |
| 7 | 1 | 190.0 | 20.0 | | | | | 390.0 | | | 80 | 150 | 1 | 120 | 170 | 0.7 | 65 | 86 |
| 8 | 1 | 190.0 | | 20.0 | | | | 390.0 | | | 80 | 150 | 1 | 120 | 170 | 0.7 | 65 | 86 |
| 9 | 1 | 190.0 | | | 20.0 | | | 390.0 | | | 80 | 150 | 1 | 120 | 170 | 0.7 | 65 | 86 |
| 10 | 1 | 190.0 | | | | 20.0 | | 390.0 | | | 80 | 150 | 1 | 120 | 170 | 0.7 | 65 | 86 |
| 11 | 1 | 190.0 | | | | | 20.0 | 390.0 | | | 80 | 150 | 1 | 120 | 170 | 0.7 | 65 | 86 |
| 12 | 1 | 210.0 | | | | | | 390.0 | | | 100 | 150 | 1 | 120 | 170 | 0.7 | 15 | 78 |
| 13 | 1 | 210.0 | | | | | | 390.0 | | | 100 | 400 | 0 | 80 | 120 | 0.7 | 30 | 82 |
| 14 | 5 | 210.0 | | | | | | 390.0 | | | 60 | 400 | 0 | 80 | 120 | 0.7 | 105 | 90 |
| 15 | 6 | 210.0 | | | | | | 390.0 | | | 60 | 120 | 2 | 150 | 220 | 0.7 | 110 | 90 |
| 16 | 7 | 210.0 | | | | | | 390.0 | | | 80 | 150 | 2 | 150 | 220 | 0.7 | 65 | 90 |
| 17 | 8 | 210.0 | | | | | | 315.0 | | | 80 | 100 | 1 | 120 | 170 | 0.7 | 26 | 82 |
| 18 | 9 | 210.0 | | | | | | 315.0 | | | 80 | 120 | 2 | 180 | 260 | 0.7 | 30 | 82 |
| 19 | 10 | 210.0 | | | | | | 390.0 | | | 80 | 300 | 2 | 150 | 220 | 0.7 | 110 | 86 |
| 20 | 10 | 210.0 | | | | | | 390.0 | | | 80 | 300 | 0 | 80 | 120 | 0.7 | 115 | 86 |
| 21 | 11 | 210.0 | | | | | | 390.0 | | | 80 | 500 | 1 | 45 | 70 | 0.6 | 65 | 86 |
| 22 | 1 | 210.0 | | | | | | 390.0 | | | 80 | 450 | 1 | 50 | 80 | 0.6 | 65 | 86 |
| 23 | 1 | 210.0 | | | | | | 210.0 | | | 80 | 100 | 1 | 200 | 300 | 0.7 | 65 | 86 |
| 24 | 1 | 210.0 | | | | | | 210.0 | | | 60 | 100 | 0 | 250 | 400 | 0.6 | 65 | 86 |
| 25 | 1 | 210.0 | | | | | | 210.0 | | | 80 | 150 | 0 | 120 | 220 | 0.5 | 70 | 86 |
| 26 | 1 | 210.0 | | | | | | 630.0 | | | 80 | 150 | 1 | 120 | 200 | 0.6 | 65 | 86 |
| 27 | 1 | 210.0 | | | | | | 630.0 | | | 80 | 450 | 1 | 120 | 150 | 1.8 | 65 | 86 |
| 28 | 12 | 210.0 | | | | | | 140.0 | | | 80 | 150 | 1 | 120 | 170 | 0.7 | 65 | 35 |
| 29 | 13 | 210.0 | | | | | | 390.0 | | | 80 | 150 | 1 | 120 | 170 | 0.7 | 65 | 40 |
| 30 | 14 | 210.0 | | | | | | 390.0 | | | 80 | 150 | 1 | 120 | 170 | 0.7 | 65 | 107 |

(First Resin C1)

0.2 parts of potassium persulfate and 79.4 parts of ion exchange water were placed into a four-necked flask equipped with a stirrer, a reflux cooling apparatus and a nitrogen gas introduction tube and nitrogen gas was introduced. Further, 19.7 parts of butyl methacrylate, 0.4 parts of methacrylic acid and 0.3 parts of a reactive surfactant (trade name "AQUALON KH-05", manufactured by Dai-ichi Kogyo Seiyaku Co., Ltd.) were mixed to obtain a mixture. The obtained mixture was added dropwise to the four-necked flask over 1 hour with stirring and then reacted at 80° C. for 2 hours. After cooling the contents to 25° C., potassium hydroxide and an appropriate amount of ion exchange water were added to adjust the pH of the liquid to 8.5. In this manner, a liquid containing the first resin C1 having a resin particle content of 25.0% was obtained.

(First Resin C2)

According to the description of "Production Example 34" of Japanese Patent Application Laid-Open No. 2014-88552, "Aqueous dispersion of graft polymer G6" was prepared. The content of the resin particle was adjusted to 25.0% to obtain a liquid containing a first resin C2. This resin includes a polyester resin as a main chain and an addition polymerization resin as a side chain and does not have a sulfonic acid group.

(First Resin C3)

"Non-spherical particle C1" was prepared according to the description in Japanese Patent Application Laid-Open No. H08-269310. The content of the resin particle was adjusted to 25.0% to obtain a liquid containing a first resin C3. The resin particle is formed of a polyester resin having no sulfonic acid group.

<Production of Second Resin>

(Second Resins 1 to 22: Block Copolymer)

A four-necked flask equipped with a stirrer, a thermometer, a nitrogen gas introduction pipe and a reflux tube was purged with nitrogen. Into this flask, 100.0 parts of methyl ethyl ketone and the monomer (unit: part) shown in "Segment A1", the RAFT agent (cumyldithiobenzoate, unit: part) and the polymerization initiator (azobisisobutyronitrile, unit: part) in Table 3 were added. After purging with nitrogen gas at 25° C. for 30 minutes, the temperature was raised to 75° C. to start the reaction. The solution was extracted at regular intervals and the dry solid content in the solution was measured to calculate the polymerization rate. In addition, the number average molecular weight of the product was measured using a part of the extracted solution.

After confirming that the polymerization rate was 95% or more, the monomer (unit: part) shown in "Segment A2" in Table 3 was added and further reacted. After confirming that the polymerization rate was 95% or more, the monomer (unit: part) shown in "Segment B1" and the monomer (unit: part) shown in "Segment B2" in Table 3 were sequentially added and further reacted. After confirming that the final polymerization rate was 98%, 50.0 parts of methyl ethyl ketone was added and the flask was cooled to stop the reaction. The reaction solution was added to a large amount of methanol and the produced precipitate was vacuum dried at 40° C. for 24 hours to obtain a second resin. The second resins 1 to 22 obtained were all water-soluble resins. Potassium hydroxide in an amount 0.9 times the acid value of the resin in terms of molar ratio and an appropriate amount of ion exchange water were added to obtain a liquid containing each second resin having the second resin content of 10.0%. The acid value, the number average molecular weight (Mn), the number average molecular weight of the A block (MnA), the number average molecular weight of the B block (MnB) and the (MnA/Mn) of the number average molecular weight of the A block/the number average molecular weight of the second resin to be obtained are shown in Table 3. The meanings of the abbreviations in Table 3 are shown below.

BzMA: Benzyl methacrylate
St: Styrene
MMA: Methyl methacrylate
HEMA: 2-Hydroxyethyl methacrylate
MAA: Methacrylic acid
nBMA: n-Butyl methacrylate

TABLE 3

| | | Production conditions | | | | | | | | | |
|---|---|---|---|---|---|---|---|---|---|---|---|
| | | A Block | | | | | | B Block | | | |
| | | Segment A1 | | | | | Segment A2 | Segment B1 | | | |
| | | BzMA | St | MMA | HEMA | MAA | MMA | MMA | HEMA | nBMA | MAA |
| Second resin (block copolymer) | 1 | 50.0 | | | | | | 30.0 | | | 20.0 |
| | 2 | | 50.0 | | | | | 30.0 | | | 20.0 |
| | 3 | 25.0 | | 25.0 | | | | 30.0 | | | 20.0 |
| | 4 | 25.0 | | | 25.0 | | | 30.0 | | | 20.0 |
| | 5 | 50.0 | | | | | | | 30.0 | | 20.0 |
| | 6 | 40.0 | | | | | 10.0 | 30.0 | | | 20.0 |
| | 7 | 50.0 | | | | | | | | 10.0 | 10.0 |
| | 8 | 50.0 | | | | | | 43.0 | | | 7.0 |
| | 9 | 50.0 | | | | | | 41.9 | | | 8.1 |
| | 10 | 50.0 | | | | | | 18.9 | | | 31.1 |
| | 11 | 50.0 | | | | | | 18.0 | | | 32.0 |
| | 12 | | | 50.0 | | | | 30.0 | | | 20.0 |
| | 13 | 50.0 | | | | | | 30.0 | | | 20.0 |
| | 14 | 50.0 | | | | | | 30.0 | | | 20.0 |
| | 15 | 50.0 | | | | | | 30.0 | | | 20.0 |
| | 16 | 50.0 | | | | | | 30.0 | | | 20.0 |
| | 17 | 30.0 | | | | | | 50.0 | | | 20.0 |
| | 18 | 35.0 | | | | | | 45.0 | | | 20.0 |
| | 19 | 75.0 | | | | | | 5.0 | | | 20.0 |
| | 20 | 80.0 | | | | | | | | | 20.0 |

TABLE 3-continued

Production conditions and characteristics of second resin (block copolymer)

| | | | | | | | |
|---|---|---|---|---|---|---|---|
| 21 | 40.0 | | 10.0 | | 40.0 | | 10.0 |
| 22 | 10.0 | | 40.0 | | | 50.0 | |

| | | Production conditions | | | | Characteristics | | | | |
|---|---|---|---|---|---|---|---|---|---|---|
| | | B Block Segment B2 | | RAFT agent | Polymerization initiator | Acid value (mgKOH/g) | Mn | MnA | MnB | Value of MnA/Mn (times) |
| | | MMA | MAA | | | | | | | |
| Second resin (block copolymer) | 1 | | | 0.5 | 0.1 | 127 | 9,000 | 4,000 | 5,000 | 0.44 |
| | 2 | | | 0.5 | 0.1 | 127 | 9,000 | 4,000 | 5,000 | 0.44 |
| | 3 | | | 0.5 | 0.1 | 127 | 9,000 | 4,000 | 5,000 | 0.44 |
| | 4 | | | 0.5 | 0.1 | 127 | 9,000 | 4,000 | 5,000 | 0.44 |
| | 5 | | | 0.5 | 0.1 | 127 | 9,000 | 4,000 | 5,000 | 0.44 |
| | 6 | | | 0.5 | 0.1 | 127 | 9,000 | 4,000 | 5,000 | 0.44 |
| | 7 | 20.0 | 10.0 | 0.5 | 0.1 | 127 | 9,000 | 4,000 | 5,000 | 0.44 |
| | 8 | | | 0.5 | 0.1 | 43 | 9,000 | 4,000 | 5,000 | 0.44 |
| | 9 | | | 0.5 | 0.1 | 50 | 9,000 | 4,000 | 5,000 | 0.44 |
| | 10 | | | 0.5 | 0.1 | 200 | 9,000 | 4,000 | 5,000 | 0.44 |
| | 11 | | | 0.5 | 0.1 | 206 | 9,000 | 4,000 | 5,000 | 0.44 |
| | 12 | | | 0.5 | 0.1 | 127 | 9,000 | 4,000 | 5,000 | 0.44 |
| | 13 | | | 1.0 | 0.1 | 127 | 4,500 | 2,000 | 2,500 | 0.44 |
| | 14 | | | 0.9 | 0.1 | 127 | 5,000 | 2,200 | 2,800 | 0.44 |
| | 15 | | | 0.3 | 0.1 | 127 | 20,000 | 9,000 | 11,000 | 0.45 |
| | 16 | | | 0.2 | 0.1 | 127 | 22,000 | 9,800 | 12,200 | 0.45 |
| | 17 | | | 0.5 | 0.1 | 127 | 9,000 | 2,500 | 6,500 | 0.28 |
| | 18 | | | 0.5 | 0.1 | 127 | 9,000 | 2,700 | 6,300 | 0.30 |
| | 19 | | | 0.5 | 0.1 | 127 | 9,000 | 7,200 | 1,800 | 0.80 |
| | 20 | | | 0.5 | 0.1 | 127 | 9,000 | 7,500 | 1,500 | 0.83 |
| | 21 | | | 0.5 | 0.1 | 62 | 9,000 | 4,000 | 5,000 | 0.44 |
| | 22 | | | 0.5 | 0.1 | 0 | 9,000 | 4,000 | 5,000 | 0.44 |

(Second Resins 23 to 40: Second Polyester Resin)

A mixture of the components (unit: g) shown in Table 4 and 0.1 parts of a catalyst (potassium titanium oxalate) was placed in a reaction vessel placed in an autoclave. After raising the temperature to 200° C. with stirring under a nitrogen atmosphere, the temperature was gradually raised to 260° C. over 4 hours to carry out an esterification reaction and a transesterification reaction. Then, the pressure was reduced to 67 Pa over 90 minutes. After continuing the transesterification reaction while maintaining the reduced pressure state at 250° C. and 67 Pa for the condensation time shown in Table 4, nitrogen gas was introduced to return the pressure to normal pressure. Then, the resin was cooled to 25° C. to obtain a second resin. The second resins 23 to 40 obtained were all water-soluble resins. An appropriate amount of ion exchange water was added to 10.0 g of the obtained second resin and the mixture was stirred at 80° C. to 95° C. for 2 hours to dissolve the second resin in water. Thus, a liquid containing each second resin having a second resin content of 10.0% was obtained. The characteristics of the obtained second polyester resin are shown in Table 4. The meanings of the abbreviations in Table 4 are EG: Ethylene glycol, 16HD: 1,6-Hexanediol, NPG: Neopentyl glycol, 14BD: 1,4-Butanediol, DMT: Dimethyl terephthalic acid, DMI: Dimethylisophthalic acid, BTA: Trimellitic acid, DMA: Dimethyl adipic acid, 5 SIPM: Sodium 5-sulfonate dimethylisophthalic acid, STPM: Sodium sulfonate dimethylterephthalic acid, 4 SIPM: Sodium 4-sulfonate dimethylisophthalic acid and SSM: Sodium sulfonate dimethylsuccinic acid.

TABLE 4

Production conditions and characteristics of second resin (second polyester resin)

| | | Production conditions | | | | | | | | | | | | Characteristics | | |
|---|---|---|---|---|---|---|---|---|---|---|---|---|---|---|---|---|
| | | EG | 16HD | NPG | 14BD | DMT | DMI | BTA | DMA | 5SIPM | STPM | 4SIPM | SSM | Condensation time (minutes) | Molar ratio of sulfonic acid group/ carboxylic acid group | Number average molecular weight |
| Second resin (second polyester resin) | 23 | 62.0 | 118.0 | | | 140.0 | 35.0 | | | 30.0 | | | | 30 | 0.10 | 5,200 |
| | 24 | | 118.0 | 104.0 | | 140.0 | 35.0 | | | 30.0 | | | | 30 | 0.10 | 5,200 |
| | 25 | | 118.0 | | 90.0 | 140.0 | 35.0 | | | 30.0 | | | | 30 | 0.10 | 5,200 |
| | 26 | 62.0 | 118.0 | | | 175.0 | | | | 30.0 | | | | 30 | 0.10 | 5,300 |
| | 27 | 62.0 | 118.0 | | | | 175.0 | | | 30.0 | | | | 30 | 0.10 | 5,100 |
| | 28 | 62.0 | 118.0 | | | 140.0 | 35.0 | | | | 30.0 | | | 30 | 0.10 | 5,300 |
| | 29 | 62.0 | 118.0 | | | 40.0 | 35.0 | | | | | 30.0 | | 30 | 0.10 | 5,200 |
| | 30 | 62.0 | 118.0 | | | | | | 157.0 | | | | 25.0 | 30 | 0.10 | 6,000 |
| | 31 | 62.0 | 118.0 | | | 140.0 | 35.0 | | | 30.0 | | | | 15 | 0.10 | 2,500 |
| | 32 | 62.0 | 118.0 | | | 140.0 | 35.0 | | | 30.0 | | | | 20 | 0.10 | 3,000 |

TABLE 4-continued

Production conditions and characteristics of second resin (second polyester resin)

| | Production conditions | | | | | | | | | | | | Characteristics | | |
|---|---|---|---|---|---|---|---|---|---|---|---|---|---|---|---|
| | EG | 16HD | NPG | 14BD | DMT | DMI | BTA | DMA | 5SIPM | STPM | 4SIPM | SSM | Condensation time (minutes) | Molar ratio of sulfonic acid group/ carboxylic acid group | Number average molecular weight |
| 33 | 62.0 | 118.0 | | | 140.0 | 35.0 | | | 30.0 | | | | 240 | 0.10 | 20,000 |
| 34 | 62.0 | 118.0 | | | 140.0 | 35.0 | | | 30.0 | | | | 300 | 0.10 | 22,000 |
| 35 | 62.0 | 118.0 | | | 144.0 | 38.0 | | | 18.0 | | | | 30 | 0.06 | 5,200 |
| 36 | 62.0 | 118.0 | | | 140.0 | 38.0 | | | 24.0 | | | | 30 | 0.08 | 5,200 |
| 37 | 62.0 | 118.0 | | | 70.0 | 28.0 | | | 148.0 | | | | 30 | 0.50 | 5,200 |
| 38 | 62.0 | 118.0 | | | 60.0 | 28.0 | | | 163.0 | | | | 30 | 0.55 | 5,200 |
| 39 | 62.0 | 118.0 | | | 140.0 | 35.0 | 21.0 | | | | | | 30 | 0.00 | 5,200 |
| 40 | 62.0 | 118.0 | | | 160.0 | 35.0 | | | | | | | 30 | 0.00 | 5,200 |

(Second Resin C1)

JONCRYL 683 (trade name, manufactured by BASF, acid value: 160 mgKOH/g, number average molecular weight: 3,500), which is an acrylic resin, was prepared. Potassium hydroxide in an amount 0.9 times the acid value of the resin in terms of molar ratio and an appropriate amount of ion exchange water were added to this acrylic resin and the mixture was stirred to obtain a liquid containing a second resin C1 having a second resin content (solid content) of 10.0%. This resin is a random copolymer having an aromatic group.

(Second Resin C2)

"Colored polyester fine particle B1" were prepared according to the description of Japanese Patent Application Laid-Open No. H08-269310. An appropriate amount of ion exchange water was added to obtain a liquid containing the second resin C2 having a second resin content of 10.0%. This resin is obtained by incorporating a coloring material (oil-based dye) in the resin particle formed of a polyester resin having a sulfonic acid group.

<Preparation of Pigment Dispersion Liquid>

(Pigment Dispersion Liquid 1)

A mixture of 10.0 parts of a pigment, 20.0 parts of a liquid containing a resin and 70.0 parts of ion exchange water was placed in a batch-type vertical sand mill (manufactured by IMEX Co., Ltd.) filled with 200 parts of zirconia beads with a diameter of 0.3 mm and dispersed for 5 hours. As the pigment, C.I. Pigment Yellow 74 (trade name "Hansa Yellow 5GX 01 LV 3344", manufactured by Clariant) was used. As the liquid containing a resin, an aqueous solution in which a water-soluble resin was dissolved in water containing potassium hydroxide in an amount equimolar to the acid value and the content of the resin was 30.0% was used. As the water-soluble resin, a styrene-ethyl acrylate-acrylic acid copolymer having an acid value of 167 mgKOH/g and a weight average molecular weight of 10,000 was used. The resultant was centrifuged to remove coarse particles and then pressure-filtered with a microfilter (manufactured by Fujifilm Corporation) having a pore diameter of 3.0 μm to obtain a pigment dispersion liquid 1. The content of the pigment in the pigment dispersion liquid 1 was 10.0% and the content of the resin was 6.0%.

(Pigment Dispersion Liquid 2)

5.0 g of concentrated hydrochloric acid was dissolved in 5.5 g of water, the solution was cooled to 5° C. and in this state, 1.6 g of 4-aminophthalic acid was added. The container containing this solution was placed in an ice bath and while maintaining the temperature of the solution was maintained at a temperature of 10° C. or less by stirring, a solution obtained by dissolving 1.8 g of sodium nitrite in 9.0 g of ion exchange water at 5° C. was added to this solution. After stirring for 15 minutes, 6.0 g of carbon black (trade name "NIPex 170IQ", manufactured by Orion Engineered Carbons) was added under stirring and the mixture was further stirred for 15 minutes to obtain a slurry. The obtained slurry was filtered through a filter paper (trade name "STANDARD FILTER PAPER No. 2", manufactured by ADVANTECH) and the particle was thoroughly washed with water and dried in an oven at 110° C. Then, the counter ion was substituted from a sodium ion to a potassium ion by an ion exchange method to obtain a self-dispersible pigment in which a —$C_6H_3$—$(COOK)_2$ group was bonded to the particle surface of carbon black. An appropriate amount of ion exchange water was added and the content of the pigment was adjusted to obtain a pigment dispersion liquid 2 having a pigment content of 10.0%.

<Preparation of Ink>

Each component shown below was mixed, sufficiently stirred and then pressure-filtered with a microfilter having a pore size of 2.5 μm to prepare an ink. "ACETYLENEOL E100" is the trade name of a nonionic surfactant manufactured by Kawaken Fine Chemicals Co., Ltd. The characteristics of the prepared ink are shown in Table 5.

Type of coloring material shown in Table 5: Amount used (%) shown in Table 5

Liquid containing first resin of type shown in Table 5: Amount (%) that becomes the content R of the first resin shown in Table 5

Liquid containing second resin of type shown in Table 5: Amount (%) that becomes the content Q (%) of the second resin shown in Table 5

Glycerin: 5.0%

Triethylene glycol: 10.0%

ACETYLENEOL E100: 0.10%

Ion exchange water: Residual amount that makes the total of the components 100.0%

<Evaluation>

An ink cartridge was filled with each of the inks obtained above and mounted on an ink jet recording apparatus (trade name "PIXUS iP3100", manufactured by Canon Inc.) that ejects ink from a recording head by the action of thermal energy. In this embodiment, the recording duty of a solid image recorded under the condition in which one ink droplet with a volume of 5 μL per droplet was applied to a unit region of ¹⁄₁,₂₀₀ inch×¹⁄₁,₂₀₀ inch is defined as 100%. In the present invention, in the evaluation criteria of the following respective evaluation items, "A" and "B" were taken as acceptable levels and "C" was taken as an unacceptable level. The evaluation results are shown in Table 5.

(Abrasion Resistance)

Using the above-mentioned ink jet recording apparatus, a solid image of 200 mm×200 mm having a recording duty of 100% was recorded on a recording medium (trade name "AURORA COAT", manufactured by Nippon Paper Industries Co., Ltd.). The image was dried at 25° C. for 24 hours and then heated at 100° C. for 1 hour using a heating oven. The obtained image was subjected to an abrasion test under the condition of 10 reciprocations with a load of 500 g using a Gakushin type tester (trade name "ABRASION RESISTANCE TESTER", manufactured by Imoto Machinery Co., Ltd.) that can perform measurement according to JIS L 0849: 2013. The image after the abrasion test was visually confirmed and the abrasion resistance of the image was evaluated according to the following evaluation criteria.

A: There were no scratches on the image.
B: The image had a scratch but the recording medium was not visible.
C: The image had a scratch and the recording medium was visible.

(Glossiness)

Using the ink jet recording apparatus, a solid image of 2 cm×2 cm having a recording duty of 100% was recorded on a recording medium (trade name "CANON PHOTO PAPER GLOSSY GOLD GL-101", manufactured by Canon Inc.). After the image was dried at 25° C. for 24 hours, two fluorescent lamps arranged in parallel at 10 cm intervals were used as an observation light source and the image was irradiated with the light of the fluorescent lamps at an angle of 45 degrees from a distance of 2 m (illumination angle: 45 degrees). The shape of the fluorescent lamps reflected on the image was visually confirmed from an angle of 45 degrees (observation angle: 45 degrees) and the glossiness of the image was evaluated according to the evaluation criteria shown below.

A: The border line between the two reflected fluorescent lamps was visible and no blurring was observed at the edge.
B: The border line between the two reflected fluorescent lamps was visible but slight blurring was observed at the edge.
C: The border line between the two reflected fluorescent lamps was not visible.

TABLE 5-1

Composition and characteristics of ink and evaluation results

| | | Composition | | | | | | |
|---|---|---|---|---|---|---|---|---|
| | | Coloring material | | Liquid containing first rein | | Liquid containing second rein | | Content |
| | | Type | Amount used (%) | Type | Amount used (%) | Type | Amount used (%) | Pigment P (%) |
| Example | 1 | Pigment dispersion liquid 1 | 34.0 | 1 | 24.0 | 1 | 8.0 | 3.4 |
| | 2 | Pigment dispersion liquid 2 | 34.0 | 1 | 24.0 | 1 | 8.0 | 3.4 |
| | 3 | Pigment dispersion liquid 1 | 34.0 | 2 | 24.0 | 1 | 8.0 | 3.4 |
| | 4 | Pigment dispersion liquid 1 | 34.0 | 3 | 24.0 | 1 | 8.0 | 3.4 |
| | 5 | Pigment dispersion liquid 1 | 34.0 | 4 | 24.0 | 1 | 8.0 | 3.4 |
| | 6 | Pigment dispersion liquid 1 | 34.0 | 5 | 24.0 | 1 | 8.0 | 3.4 |
| | 7 | Pigment dispersion liquid 1 | 34.0 | 6 | 24.0 | 1 | 8.0 | 3.4 |
| | 8 | Pigment dispersion liquid 1 | 34.0 | 1 | 24.0 | 2 | 8.0 | 3.4 |
| | 9 | Pigment dispersion liquid 1 | 34.0 | 1 | 24.0 | 3 | 8.0 | 3.4 |
| | 10 | Pigment dispersion liquid 1 | 34.0 | 1 | 24.0 | 4 | 8.0 | 3.4 |
| | 11 | Pigment dispersion liquid 1 | 34.0 | 1 | 24.0 | 5 | 8.0 | 3.4 |
| | 12 | Pigment dispersion liquid 1 | 34.0 | 1 | 24.0 | 6 | 8.0 | 3.4 |
| | 13 | Pigment dispersion liquid 1 | 34.0 | 1 | 24.0 | 7 | 8.0 | 3.4 |
| | 14 | Pigment dispersion liquid 1 | 34.0 | 7 | 24.0 | 1 | 8.0 | 3.4 |
| | 15 | Pigment dispersion liquid 1 | 34.0 | 8 | 24.0 | 1 | 8.0 | 3.4 |
| | 16 | Pigment dispersion liquid 1 | 34.0 | 9 | 24.0 | 1 | 8.0 | 3.4 |
| | 17 | Pigment dispersion liquid 1 | 34.0 | 10 | 24.0 | 1 | 8.0 | 3.4 |
| | 18 | Pigment dispersion liquid 1 | 34.0 | 11 | 24.0 | 1 | 8.0 | 3.4 |
| | 19 | Pigment dispersion liquid 1 | 34.0 | 12 | 24.0 | 1 | 8.0 | 3.4 |
| | 20 | Pigment dispersion liquid 1 | 34.0 | 13 | 24.0 | 1 | 8.0 | 3.4 |
| | 21 | Pigment dispersion liquid 1 | 34.0 | 14 | 24.0 | 1 | 8.0 | 3.4 |
| | 22 | Pigment dispersion liquid 1 | 34.0 | 15 | 24.0 | 1 | 8.0 | 3.4 |
| | 23 | Pigment dispersion liquid 1 | 34.0 | 1 | 24.0 | 8 | 8.0 | 3.4 |

| | | Composition Content | | Characteristics | | | Evaluation results | |
|---|---|---|---|---|---|---|---|---|
| | | First resin R (%) | Second resin Q (%) | Value of R/P (times) | Value of R/Q (times) | Viscosity (mPa·s) | Abrasion resistance | Glossiness |
| Example | 1 | 6.0 | 0.8 | 1.8 | 7.5 | 2.5 | A | A |
| | 2 | 6.0 | 0.8 | 1.8 | 7.5 | 2.5 | A | A |
| | 3 | 6.0 | 0.8 | 1.8 | 7.5 | 2.5 | A | A |
| | 4 | 6.0 | 0.8 | 1.8 | 7.5 | 2.5 | A | A |

TABLE 5-1-continued

Composition and characteristics of ink and evaluation results

| | | | | | | | |
|---|---|---|---|---|---|---|---|
| 5 | 6.0 | 0.8 | 1.8 | 7.5 | 2.5 | A | A |
| 6 | 6.0 | 0.8 | 1.8 | 7.5 | 2.5 | A | A |
| 7 | 6.0 | 0.8 | 1.8 | 7.5 | 2.5 | A | A |
| 8 | 6.0 | 0.8 | 1.8 | 7.5 | 2.5 | A | A |
| 9 | 6.0 | 0.8 | 1.8 | 7.5 | 2.5 | A | A |
| 10 | 6.0 | 0.8 | 1.8 | 7.5 | 2.5 | A | A |
| 11 | 6.0 | 0.8 | 1.8 | 7.5 | 2.5 | A | A |
| 12 | 6.0 | 0.8 | 1.8 | 7.5 | 2.5 | A | A |
| 13 | 6.0 | 0.8 | 1.8 | 7.5 | 2.5 | A | A |
| 14 | 5.4 | 0.8 | 1.6 | 6.8 | 2.5 | A | A |
| 15 | 5.4 | 0.8 | 1.6 | 6.8 | 2.5 | A | A |
| 16 | 5.4 | 0.8 | 1.6 | 6.8 | 2.5 | A | A |
| 17 | 5.4 | 0.8 | 1.6 | 6.8 | 2.5 | A | A |
| 18 | 5.4 | 0.8 | 1.6 | 6.8 | 2.5 | A | A |
| 19 | 6.0 | 0.8 | 1.8 | 7.5 | 2.5 | B | B |
| 20 | 6.0 | 0.8 | 1.8 | 7.5 | 2.5 | A | A |
| 21 | 6.0 | 0.8 | 1.8 | 7.5 | 2.5 | A | A |
| 22 | 6.0 | 0.8 | 1.8 | 7.5 | 2.5 | B | A |
| 23 | 6.0 | 0.8 | 1.8 | 7.5 | 2.5 | A | B |

TABLE 5-2

Composition and characteristics of ink and evaluation results

| | | Composition | | | | | | |
|---|---|---|---|---|---|---|---|---|
| | | Coloring material | | Liquid containing first rein | | Liquid containing second rein | | Content |
| | | Type | Amount used (%) | Type | Amount used (%) | Type | Amount used (%) | Pigment P (%) |
| Example | 24 | Pigment dispersion liquid 1 | 34.0 | 1 | 24.0 | 9 | 8.0 | 3.4 |
| | 25 | Pigment dispersion liquid 1 | 34.0 | 1 | 24.0 | 10 | 8.0 | 3.4 |
| | 26 | Pigment dispersion liquid 1 | 34.0 | 1 | 24.0 | 11 | 8.0 | 3.4 |
| | 27 | Pigment dispersion liquid 1 | 34.0 | 16 | 24.0 | 1 | 8.0 | 3.4 |
| | 28 | Pigment dispersion liquid 1 | 34.0 | 1 | 24.0 | 12 | 8.0 | 3.4 |
| | 29 | Pigment dispersion liquid 1 | 34.0 | 1 | 24.0 | 13 | 8.0 | 3.4 |
| | 30 | Pigment dispersion liquid 1 | 34.0 | 1 | 24.0 | 14 | 8.0 | 3.4 |
| | 31 | Pigment dispersion liquid 1 | 34.0 | 1 | 24.0 | 15 | 8.0 | 3.4 |
| | 32 | Pigment dispersion liquid 1 | 34.0 | 1 | 24.0 | 16 | 8.0 | 3.4 |
| | 33 | Pigment dispersion liquid 1 | 34.0 | 1 | 24.0 | 17 | 8.0 | 3.4 |
| | 34 | Pigment dispersion liquid 1 | 34.0 | 1 | 24.0 | 18 | 8.0 | 3.4 |
| | 35 | Pigment dispersion liquid 1 | 34.0 | 1 | 24.0 | 19 | 8.0 | 3.4 |
| | 36 | Pigment dispersion liquid 1 | 34.0 | 1 | 24.0 | 20 | 8.0 | 3.4 |
| | 37 | Pigment dispersion liquid 1 | 34.0 | 1 | 22.0 | 1 | 15.0 | 3.4 |
| | 38 | Pigment dispersion liquid 1 | 34.0 | 1 | 23.0 | 1 | 14.5 | 3.4 |
| | 39 | Pigment dispersion liquid 1 | 34.0 | 1 | 28.0 | 1 | 0.7 | 3.4 |
| | 40 | Pigment dispersion liquid 1 | 34.0 | 1 | 27.0 | 1 | 0.6 | 3.4 |
| | 41 | Pigment dispersion liquid 1 | 34.0 | 17 | 24.0 | 1 | 8.0 | 3.4 |
| | 42 | Pigment dispersion liquid 1 | 34.0 | 18 | 24.0 | 1 | 8.0 | 3.4 |
| | 43 | Pigment dispersion liquid 1 | 34.0 | 19 | 24.0 | 1 | 8.0 | 3.4 |
| | 44 | Pigment dispersion liquid 1 | 34.0 | 20 | 24.0 | 1 | 8.0 | 3.4 |
| | 45 | Pigment dispersion liquid 1 | 34.0 | 21 | 24.0 | 1 | 8.0 | 3.4 |
| | 46 | Pigment dispersion liquid 1 | 34.0 | 22 | 24.0 | 1 | 8.0 | 3.4 |

| | | Composition Content | | Characteristics | | | Evaluation results | |
|---|---|---|---|---|---|---|---|---|
| | | First resin R (%) | Second resin Q (%) | Value of R/P (times) | Value of R/Q (times) | Viscosity (mPa·s) | Abrasion resistance | Glossiness |
| Example | 24 | 6.0 | 0.8 | 1.8 | 7.5 | 2.5 | A | A |
| | 25 | 6.0 | 0.8 | 1.8 | 7.5 | 2.5 | A | A |
| | 26 | 6.0 | 0.8 | 1.8 | 7.5 | 2.5 | A | B |
| | 27 | 6.0 | 0.8 | 1.8 | 7.5 | 2.5 | B | B |
| | 28 | 6.0 | 0.8 | 1.8 | 7.5 | 2.5 | A | B |
| | 29 | 6.0 | 0.8 | 1.8 | 7.5 | 2.5 | B | A |
| | 30 | 6.0 | 0.8 | 1.8 | 7.5 | 2.5 | A | A |
| | 31 | 6.0 | 0.8 | 1.8 | 7.5 | 2.5 | A | A |

TABLE 5-2-continued

Composition and characteristics of ink and evaluation results

| | | | | | | | |
|---|---|---|---|---|---|---|---|
| 32 | 6.0 | 0.8 | 1.8 | 7.5 | 2.5 | A | B |
| 33 | 6.0 | 0.8 | 1.8 | 7.5 | 2.5 | A | B |
| 34 | 6.0 | 0.8 | 1.8 | 7.5 | 2.5 | A | A |
| 35 | 6.0 | 0.8 | 1.8 | 7.5 | 2.5 | A | A |
| 36 | 6.0 | 0.8 | 1.8 | 7.5 | 2.5 | A | B |
| 37 | 5.5 | 1.50 | 1.6 | 3.7 | 4.1 | B | A |
| 38 | 5.8 | 1.45 | 1.7 | 4.0 | 4.2 | A | A |
| 39 | 7.0 | 0.07 | 2.1 | 100.0 | 2.2 | A | A |
| 40 | 6.8 | 0.06 | 2.0 | 113.3 | 2.1 | A | B |
| 41 | 6.0 | 0.8 | 1.8 | 7.5 | 2.5 | A | B |
| 42 | 6.0 | 0.8 | 1.8 | 7.5 | 2.5 | A | A |
| 43 | 6.0 | 0.8 | 1.8 | 7.5 | 2.5 | A | A |
| 44 | 6.0 | 0.8 | 1.8 | 7.5 | 2.5 | A | B |
| 45 | 6.0 | 0.8 | 1.8 | 7.5 | 2.5 | A | B |
| 46 | 6.0 | 0.8 | 1.8 | 7.5 | 2.5 | A | A |

TABLE 5-3

Composition and characteristics of ink and evaluation results

| | | Composition | | | | | | |
|---|---|---|---|---|---|---|---|---|
| | | Coloring material | | Liquid containing first rein | | Liquid containing second rein | | Content |
| | | Type | Amount used (%) | Type | Amount used (%) | Type | Amount used (%) | Pigment P (%) |
| Example | 47 | Pigment dispersion liquid 1 | 34.0 | 23 | 24.0 | 1 | 8.0 | 3.4 |
| | 48 | Pigment dispersion liquid 1 | 34.0 | 24 | 24.0 | 1 | 8.0 | 3.4 |
| | 49 | Pigment dispersion liquid 1 | 34.0 | 25 | 24.0 | 1 | 8.0 | 3.4 |
| | 50 | Pigment dispersion liquid 1 | 34.0 | 26 | 24.0 | 1 | 8.0 | 3.4 |
| | 51 | Pigment dispersion liquid 1 | 34.0 | 27 | 24.0 | 1 | 8.0 | 3.4 |
| | 52 | Pigment dispersion liquid 1 | 34.0 | 28 | 24.0 | 1 | 8.0 | 3.4 |
| | 53 | Pigment dispersion liquid 1 | 34.0 | 29 | 24.0 | 1 | 8.0 | 3.4 |
| | 54 | Pigment dispersion liquid 1 | 34.0 | 30 | 24.0 | 1 | 8.0 | 3.4 |
| | 55 | C.I. Direct Blue199 | 3.4 | 1 | 24.0 | 1 | 8.0 | 0.0 |
| | 56 | Pigment dispersion liquid 1 | 34.0 | 1 | 24.0 | 23 | 10.0 | 3.4 |
| | 57 | Pigment dispersion liquid 2 | 34.0 | 1 | 24.0 | 23 | 10.0 | 3.4 |
| | 58 | Pigment dispersion liquid 1 | 34.0 | 2 | 24.0 | 23 | 10.0 | 3.4 |
| | 59 | Pigment dispersion liquid 1 | 34.0 | 3 | 24.0 | 23 | 10.0 | 3.4 |
| | 60 | Pigment dispersion liquid 1 | 34.0 | 4 | 24.0 | 23 | 10.0 | 3.4 |
| | 61 | Pigment dispersion liquid 1 | 34.0 | 5 | 24.0 | 23 | 10.0 | 3.4 |
| | 62 | Pigment dispersion liquid 1 | 34.0 | 6 | 24.0 | 23 | 10.0 | 3.4 |
| | 63 | Pigment dispersion liquid 1 | 34.0 | 1 | 24.0 | 24 | 10.0 | 3.4 |
| | 64 | Pigment dispersion liquid 1 | 34.0 | 1 | 24.0 | 25 | 10.0 | 3.4 |
| | 65 | Pigment dispersion liquid 1 | 34.0 | 1 | 24.0 | 26 | 10.0 | 3.4 |
| | 66 | Pigment dispersion liquid 1 | 34.0 | 1 | 24.0 | 27 | 10.0 | 3.4 |
| | 67 | Pigment dispersion liquid 1 | 34.0 | 1 | 24.0 | 28 | 10.0 | 3.4 |
| | 68 | Pigment dispersion liquid 1 | 34.0 | 1 | 24.0 | 29 | 10.0 | 3.4 |
| | 69 | Pigment dispersion liquid 1 | 34.0 | 12 | 24.0 | 23 | 10.0 | 3.4 |

| | | Composition Content | | Characteristics | | | Evaluation results | |
|---|---|---|---|---|---|---|---|---|
| | | First resin R (%) | Second resin Q (%) | Value of R/P (times) | Value of R/Q (times) | Viscosity (mPa·s) | Abrasion resistance | Glossiness |
| Example | 47 | 6.0 | 0.8 | 1.8 | 7.5 | 2.5 | A | A |
| | 48 | 6.0 | 0.8 | 1.8 | 7.5 | 2.5 | A | B |
| | 49 | 6.0 | 0.8 | 1.8 | 7.5 | 2.5 | A | B |
| | 50 | 6.0 | 0.8 | 1.8 | 7.5 | 2.5 | A | A |
| | 51 | 6.0 | 0.8 | 1.8 | 7.5 | 2.5 | A | A |
| | 52 | 6.0 | 0.8 | 1.8 | 7.5 | 2.5 | B | A |
| | 53 | 6.0 | 0.8 | 1.8 | 7.5 | 2.5 | A | A |
| | 54 | 6.0 | 0.8 | 1.8 | 7.5 | 2.5 | A | A |
| | 55 | 6.0 | 0.8 | — | 7.5 | 2.2 | B | A |
| | 56 | 6.0 | 1.0 | 1.8 | 6.0 | 2.5 | A | A |
| | 57 | 6.0 | 1.0 | 1.8 | 6.0 | 2.5 | A | A |
| | 58 | 6.0 | 1.0 | 1.8 | 6.0 | 2.5 | A | A |

TABLE 5-3-continued

Composition and characteristics of ink and evaluation results

| | | | | | | | |
|---|---|---|---|---|---|---|---|
| 59 | 6.0 | 1.0 | 1.8 | 6.0 | 2.5 | A | A |
| 60 | 6.0 | 1.0 | 1.8 | 6.0 | 2.5 | A | A |
| 61 | 6.0 | 1.0 | 1.8 | 6.0 | 2.5 | A | A |
| 62 | 6.0 | 1.0 | 1.8 | 6.0 | 2.5 | A | A |
| 63 | 6.0 | 1.0 | 1.8 | 6.0 | 2.5 | A | A |
| 64 | 6.0 | 1.0 | 1.8 | 6.0 | 2.5 | A | A |
| 65 | 6.0 | 1.0 | 1.8 | 6.0 | 2.5 | A | A |
| 66 | 6.0 | 1.0 | 1.8 | 6.0 | 2.5 | A | A |
| 67 | 6.0 | 1.0 | 1.8 | 6.0 | 2.5 | A | A |
| 68 | 6.0 | 1.0 | 1.8 | 6.0 | 2.5 | A | A |
| 69 | 6.0 | 1.0 | 1.8 | 6.0 | 2.5 | B | B |

TABLE 5-4

Composition and characteristics of ink and evaluation results

| | Composition | | | | | | Content |
|---|---|---|---|---|---|---|---|
| | Coloring material | | Liquid containing first rein | | Liquid containing second rein | | Pigment P (%) |
| | Type | Amount used (%) | Type | Amount used (%) | Type | Amount used (%) | |
| Example 70 | Pigment dispersion liquid 1 | 34.0 | 13 | 24.0 | 23 | 10.0 | 3.4 |
| 71 | Pigment dispersion liquid 1 | 34.0 | 14 | 24.0 | 23 | 10.0 | 3.4 |
| 72 | Pigment dispersion liquid 1 | 34.0 | 15 | 24.0 | 23 | 10.0 | 3.4 |
| 73 | Pigment dispersion liquid 1 | 34.0 | 16 | 24.0 | 23 | 10.0 | 3.4 |
| 74 | Pigment dispersion liquid 1 | 34.0 | 1 | 24.0 | 30 | 10.0 | 3.4 |
| 75 | Pigment dispersion liquid 1 | 34.0 | 1 | 24.0 | 31 | 10.0 | 3.4 |
| 76 | Pigment dispersion liquid 1 | 34.0 | 1 | 24.0 | 32 | 10.0 | 3.4 |
| 77 | Pigment dispersion liquid 1 | 34.0 | 1 | 24.0 | 33 | 10.0 | 3.4 |
| 78 | Pigment dispersion liquid 1 | 34.0 | 1 | 24.0 | 34 | 10.0 | 3.4 |
| 79 | Pigment dispersion liquid 1 | 34.0 | 1 | 24.0 | 35 | 10.0 | 3.4 |
| 80 | Pigment dispersion liquid 1 | 34.0 | 1 | 24.0 | 36 | 10.0 | 3.4 |
| 81 | Pigment dispersion liquid 1 | 34.0 | 1 | 24.0 | 37 | 10.0 | 3.4 |
| 82 | Pigment dispersion liquid 1 | 34.0 | 1 | 24.0 | 38 | 10.0 | 3.4 |
| 83 | Pigment dispersion liquid 1 | 34.0 | 1 | 22.0 | 23 | 15.0 | 3.4 |
| 84 | Pigment dispersion liquid 1 | 34.0 | 1 | 23.0 | 23 | 14.5 | 3.4 |
| 85 | Pigment dispersion liquid 1 | 34.0 | 1 | 28.0 | 23 | 0.7 | 3.4 |
| 86 | Pigment dispersion liquid 1 | 34.0 | 1 | 27.0 | 23 | 0.6 | 3.4 |
| 87 | Pigment dispersion liquid 1 | 34.0 | 17 | 24.0 | 23 | 10.0 | 3.4 |
| 88 | Pigment dispersion liquid 1 | 34.0 | 18 | 24.0 | 23 | 10.0 | 3.4 |
| 89 | Pigment dispersion liquid 1 | 34.0 | 19 | 24.0 | 23 | 10.0 | 3.4 |
| 90 | Pigment dispersion liquid 1 | 34.0 | 20 | 24.0 | 23 | 10.0 | 3.4 |
| 91 | Pigment dispersion liquid 1 | 34.0 | 21 | 24.0 | 23 | 10.0 | 3.4 |
| 92 | Pigment dispersion liquid 1 | 34.0 | 22 | 24.0 | 23 | 10.0 | 3.4 |

| | Composition Content | | Characteristics | | | Evaluation results | |
|---|---|---|---|---|---|---|---|
| | First resin R (%) | Second resin Q (%) | Value of R/P (times) | Value of R/Q (times) | Viscosity (mPa·s) | Abrasion resistance | Glossiness |
| Example 70 | 6.0 | 1.0 | 1.8 | 6.0 | 2.5 | A | A |
| 71 | 6.0 | 1.0 | 1.8 | 6.0 | 2.5 | A | A |
| 72 | 6.0 | 1.0 | 1.8 | 6.0 | 2.5 | B | A |
| 73 | 6.0 | 1.0 | 1.8 | 6.0 | 2.5 | B | B |
| 74 | 6.0 | 1.0 | 1.8 | 6.0 | 2.5 | A | B |
| 75 | 6.0 | 1.0 | 1.8 | 6.0 | 2.5 | B | A |
| 76 | 6.0 | 1.0 | 1.8 | 6.0 | 2.5 | A | A |
| 77 | 6.0 | 1.0 | 1.8 | 6.0 | 2.5 | A | A |
| 78 | 6.0 | 1.0 | 1.8 | 6.0 | 2.5 | A | B |
| 79 | 6.0 | 1.0 | 1.8 | 6.0 | 2.5 | A | B |
| 80 | 6.0 | 1.0 | 1.8 | 6.0 | 2.5 | A | A |
| 81 | 6.0 | 1.0 | 1.8 | 6.0 | 2.5 | A | A |
| 82 | 6.0 | 1.0 | 1.8 | 6.0 | 2.5 | A | B |
| 83 | 5.5 | 1.50 | 1.6 | 3.7 | 4.1 | B | A |
| 84 | 5.8 | 1.45 | 1.7 | 4.0 | 4.2 | A | A |
| 85 | 7.0 | 0.07 | 2.1 | 100.0 | 2.2 | A | A |

TABLE 5-4-continued

| Composition and characteristics of ink and evaluation results | | | | | | | |
|---|---|---|---|---|---|---|---|
| 86 | 6.8 | 0.06 | 2.0 | 113.3 | 2.1 | A | B |
| 87 | 6.0 | 1.0 | 1.8 | 6.0 | 2.5 | A | B |
| 88 | 6.0 | 1.0 | 1.8 | 6.0 | 2.5 | A | A |
| 89 | 6.0 | 1.0 | 1.8 | 6.0 | 2.5 | A | A |
| 90 | 6.0 | 1.0 | 1.8 | 6.0 | 2.5 | A | B |
| 91 | 6.0 | 1.0 | 1.8 | 6.0 | 2.5 | A | B |
| 92 | 6.0 | 1.0 | 1.8 | 6.0 | 2.5 | A | A |

TABLE 5-5

Composition and characteristics of ink and evaluation results

| | | Composition | | | | | | |
|---|---|---|---|---|---|---|---|---|
| | | Coloring material | | Liquid containing first rein | | Liquid containing second rein | | Content |
| | | Type | Amount used (%) | Type | Amount used (%) | Type | Amount used (%) | Pigment P (%) |
| Example | 93 | Pigment dispersion liquid 1 | 34.0 | 23 | 24.0 | 23 | 10.0 | 3.4 |
| | 94 | Pigment dispersion liquid 1 | 34.0 | 24 | 24.0 | 23 | 10.0 | 3.4 |
| | 95 | Pigment dispersion liquid 1 | 34.0 | 25 | 24.0 | 23 | 10.0 | 3.4 |
| | 96 | Pigment dispersion liquid 1 | 34.0 | 26 | 24.0 | 23 | 10.0 | 3.4 |
| | 97 | Pigment dispersion liquid 1 | 34.0 | 27 | 24.0 | 23 | 10.0 | 3.4 |
| | 98 | Pigment dispersion liquid 1 | 34.0 | 28 | 24.0 | 23 | 10.0 | 3.4 |
| | 99 | Pigment dispersion liquid 1 | 34.0 | 29 | 24.0 | 23 | 10.0 | 3.4 |
| | 100 | Pigment dispersion liquid 1 | 34.0 | 30 | 24.0 | 23 | 10.0 | 3.4 |
| | 101 | C.I. Direct Blue 199 | 3.4 | 1 | 24.0 | 23 | 10.0 | 0.0 |
| Comparative Example | 1 | Pigment dispersion liquid 1 | 34.0 | — | | 1 | 8.0 | 3.4 |
| | 2 | Pigment dispersion liquid 1 | 34.0 | C1 | 24.0 | 1 | 8.0 | 3.4 |
| | 3 | Pigment dispersion liquid 1 | 34.0 | 1 | 24.0 | — | | 3.4 |
| | 4 | Pigment dispersion liquid 1 | 34.0 | 1 | 24.0 | 21 | 8.0 | 3.4 |
| | 5 | Pigment dispersion liquid 1 | 34.0 | 1 | 24.0 | 22 | 8.0 | 3.4 |
| | 6 | Pigment dispersion liquid 1 | 34.0 | 1 | 24.0 | C1 | 8.0 | 3.4 |
| | 7 | Pigment dispersion liquid 1 | 34.0 | — | | 23 | 10.0 | 3.4 |
| | 8 | Pigment dispersion liquid 1 | 34.0 | C1 | 24.0 | 23 | 10.0 | 3.4 |
| | 9 | Pigment dispersion liquid 1 | 34.0 | 1 | 24.0 | 39 | 10.0 | 3.4 |
| | 10 | Pigment dispersion liquid 1 | 34.0 | 1 | 24.0 | 40 | 10.0 | 3.4 |
| | 11 | Pigment dispersion liquid 1 | 34.0 | C2 | 24.0 | — | 8.0 | 3.4 |
| | 12 | — | | C3 | 24.0 | C2 | 10.0 | — |

| | | Compostion Content | | Characteristics | | | | |
|---|---|---|---|---|---|---|---|---|
| | | First resin | Second resin | Value of | Value of | | Evaluation results | |
| | | R (%) | Q (%) | R/P (times) | R/Q (times) | Viscosity (mPa · s) | Abrasion resistance | Glossiness |
| Example | 93 | 6.0 | 1.0 | 1.8 | 6.0 | 2.5 | A | A |
| | 94 | 6.0 | 1.0 | 1.8 | 6.0 | 2.5 | A | B |
| | 95 | 6.0 | 1.0 | 1.8 | 6.0 | 2.5 | A | B |
| | 96 | 6.0 | 1.0 | 1.8 | 6.0 | 2.5 | A | A |
| | 97 | 6.0 | 1.0 | 1.8 | 6.0 | 2.5 | A | A |
| | 98 | 6.0 | 1.0 | 1.8 | 6.0 | 2.5 | B | A |
| | 99 | 6.0 | 1.0 | 1.8 | 6.0 | 2.5 | A | A |
| | 100 | 6.0 | 1.0 | 1.8 | 6.0 | 2.5 | A | A |
| | 101 | 6.0 | 1.0 | — | 6.0 | 2.5 | B | A |
| Comparative Example | 1 | 0.0 | 0.8 | 0.0 | 0.0 | 2.3 | C | A |
| | 2 | 6.0 | 0.8 | 1.8 | 7.5 | 2.5 | C | A |
| | 3 | 6.0 | 0.0 | 1.8 | — | 2.1 | A | C |
| | 4 | 6.0 | 0.8 | 1.8 | 7.5 | 3.0 | A | C |
| | 5 | 6.0 | 0.8 | 1.8 | 7.5 | 2.5 | C | C |
| | 6 | 6.0 | 0.8 | 1.8 | 7.5 | 2.5 | B | C |
| | 7 | 0.0 | 1.0 | 0.0 | 0.0 | 2.3 | C | A |
| | 8 | 6.0 | 1.0 | 1.8 | 6.0 | 2.5 | C | A |
| | 9 | 6.0 | 1.0 | 1.8 | 6.0 | 3.0 | A | C |
| | 10 | 6.0 | 1.0 | 1.8 | 6.0 | 2.5 | C | C |
| | 11 | 6.0 | 0.8 | 1.8 | 7.5 | 2.5 | C | C |
| | 12 | 6.0 | 1.0 | — | 6.0 | 2.5 | C | C |

(Light Fastness)

Using the ink jet recording apparatus using each of the inks of Examples 1 and 14 to 18, a solid image of 2 cm×2 cm having a recording duty of 100% was recorded on a recording medium (trade name "CANON PHOTO PAPER GLOSSY GOLD GL-101", manufactured by Canon Inc.). After the images were dried at 25° C. for 24 hours, L*, a* and b* were measured using a spectrophotometer (trade name "Spectrolino", manufactured by Gretag Macbeth). Next, a xenon weather meter (trade name "Atlas Weather Meter Ci4000", manufactured by Suga Test Instruments Co., Ltd.) was used to irradiate the image with xenon light. The irradiation conditions were an irradiation intensity of 0.39 W/m$^2$, a black panel temperature of 63° C., a relative humidity of 70% and an irradiation time of 100 hours. After irradiation with xenon light, L*, a* and b* of the image were measured. L*, a* and b* of the image before irradiation with xenon light were set to "$L_1$*", "$a_1$*" and "$b_1$*" and L*, a* and b* of the image after irradiation were set to "$L_2$*", "$a_2$" and "$b_2$*". From each of the measured values, the color difference $\Delta E=\{(L_1^*-L_2^*)^2+(a_1^*-a_2^*)^2+(b_1^*-b_2^*)^2\}^{1/2}$ was calculated. It can be determined that the smaller the value of ΔE, the less likely it is that the color is faded due to light. When the ΔE values calculated in this manner were compared, it was confirmed that all of Examples 14 to 18 had a smaller ΔE than that of Example 1 and had good light fastness.

According to the present invention, it is possible to provide an aqueous ink for ink jet capable of recording an image having excellent abrasion resistance and glossiness. In addition, according to another aspect of the present invention, it is possible to provide an ink cartridge and an ink jet recording method using the aqueous ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049697, filed Mar. 19, 2020, Japanese Patent Application No. 2020-049698, filed Mar. 19, 2020 Japanese Patent Application No. 2020-049699, filed Mar. 19, 2020 and Japanese Patent Application No. 2021-023121, filed Feb. 17, 2021, which are hereby incorporated by reference herein in their entirety.

What is claimed is:

1. An aqueous ink for ink jet comprising a coloring material and a plurality of resins different from the coloring material,
   wherein the plurality of resins includes a first resin and a second resin,
   wherein the coloring material is dispersed by a resin dispersant other than the first resin and the second resin,
   wherein the first resin is a resin particle formed of a first polyester resin not having a sulfonic acid group and including a unit derived from a polyhydric alcohol and a unit derived from a polycarboxylic acid, and
   wherein the second resin is a water-soluble resin that is present in the aqueous ink in a dissolved state, and
   wherein the second resin is a block copolymer containing an A block having no acid group and a B block having an acid group.

2. The aqueous ink according to claim 1, wherein an acid value of the first polyester resin is 2 mgKOH/g or more to 30 mgKOH/g or less.

3. The aqueous ink according to claim 1, wherein the first polyester resin contains a unit derived from an aromatic compound.

4. The aqueous ink according to claim 1, wherein the second resin contains a unit derived from an aromatic compound.

5. The aqueous ink according to claim 1, wherein a number average molecular weight of the second resin is 3,000 or more to 20,000 or less.

6. The aqueous ink according to claim 1, wherein a number average molecular weight of the A block of the block copolymer is 0.30 times or more to 0.80 times or less a number average molecular weight of the block copolymer in terms of ratio.

7. The aqueous ink according to claim 1, wherein a content (% by mass) of the first resin is 4.0 times or more to 100.0 times or less a content (% by mass) of the second resin in terms of mass ratio.

8. The aqueous ink according to claim 1, wherein the coloring material comprises a pigment.

9. An ink cartridge comprising an ink and an ink storage portion that stores the ink, wherein the ink comprises the aqueous ink according to claim 1.

10. An ink jet recording method comprising ejecting an ink from an ink jet recording head to record an image on a recording medium, wherein the ink comprises the aqueous ink according to claim 1.

11. The aqueous ink according to claim 8, wherein a content (% by mass) of the first resin in the ink is 0.5 times or more to 3.0 times or less a content (% by mass) of the pigment in terms of mass ratio.

12. The aqueous ink according to claim 1, wherein an acid value of the block copolymer is 50 mgKOH/g or more to 200 mgKOH/g or less.

13. The aqueous ink according to claim 1, wherein a number average molecular weight of the first polyester resin is 3,000 or more to 30,000 or less.

14. The aqueous ink according to claim 1, wherein a content (% by mass) of the coloring material in the ink is 0.1% by mass or more to 15.0% by mass or less based on the total mass of the ink.

15. The aqueous ink according to claim 1, wherein a content (% by mass) of the first resin in the ink is 0.1% by mass or more to 15.0% by mass or less based on the total mass of the ink.

16. The aqueous ink according to claim 1, wherein a content (% by mass) of the second resin in the ink is 0.1% by mass or more to 5.0% by mass or less based on the total mass of the ink.

17. The aqueous ink according to claim 1, wherein the A block is a hydrophobic polymer block.

* * * * *